(12) United States Patent
Goto et al.

(10) Patent No.: US 7,343,316 B2
(45) Date of Patent: Mar. 11, 2008

(54) NETWORK BASED WORK SHIFT SCHEDULE GENERATION UTILIZING A TEMPORARY WORK SHIFT SCHEDULE

(75) Inventors: Hideo Goto, Tokyo (JP); Takashi Masuya, Tokyo (JP); Yoshio Uratani, Tokyo (JP); Manabu Nakanishi, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 905 days.

(21) Appl. No.: 09/819,856

(22) Filed: Mar. 29, 2001

(65) Prior Publication Data

US 2001/0042001 A1    Nov. 15, 2001

(30) Foreign Application Priority Data

Mar. 29, 2000    (JP)    ............................ 2000-089989

(51) Int. Cl.
*G06F 9/46*    (2006.01)
(52) U.S. Cl. ......................................................... 705/9
(58) Field of Classification Search ................. 705/9
See application file for complete search history.

(56) References Cited

U.S. PATENT DOCUMENTS

| | | | | |
|---|---|---|---|---|
| 5,111,391 A | * | 5/1992 | Fields et al. .................... | 705/9 |
| 5,117,353 A | * | 5/1992 | Stipanovich et al. .......... | 705/11 |
| 5,325,292 A | * | 6/1994 | Crockett ......................... | 705/9 |
| 5,343,387 A | * | 8/1994 | Honma et al. ................. | 705/9 |
| 5,467,268 A | * | 11/1995 | Sisley et al. .................... | 705/9 |
| 5,634,055 A | * | 5/1997 | Barnewall et al. ...... | 707/103 R |
| 5,907,829 A | * | 5/1999 | Kida .............................. | 705/9 |
| 5,911,134 A | * | 6/1999 | Castonguay et al. ........... | 705/9 |
| 5,943,652 A | * | 8/1999 | Sisley et al. .................... | 705/9 |
| 5,960,406 A | * | 9/1999 | Rasansky et al. .............. | 705/9 |
| 6,049,776 A | * | 4/2000 | Donnelly et al. .............. | 705/8 |
| 6,104,788 A | * | 8/2000 | Shaffer et al. ........... | 379/93.17 |

(Continued)

FOREIGN PATENT DOCUMENTS

JP    06-223076    8/1994

(Continued)

OTHER PUBLICATIONS

Jarrah, Ahmad et al., Solving Large-scale Tour Scheduling Problems Management Science, vol. 40, No. 9, Sep. 1994, pp. 1124-1144.*

(Continued)

*Primary Examiner*—Tariq R. Hafiz
*Assistant Examiner*—Scott L. Jarrett
(74) *Attorney, Agent, or Firm*—Oblon, Spivak, McClelland, Maier & Neustadt, P.C.

(57) ABSTRACT

A work management apparatus generates a temporary shift table in which scheduled work times of employees are temporarily set, based on an employee information file and work management file stored in a file memory. The work management apparatus sends the generated temporary shift table to a plurality of portable terminals over a network. When receiving, over the network, response information sent from the plurality of portable terminals in response to the sent temporary shift table, the work management apparatus generates a settled shift table in which scheduled work times of employees are settled, based on the received response information. The work management apparatus automatically sends the generated settled shift table to the plurality of portable terminals over the network.

7 Claims, 21 Drawing Sheets

U.S. PATENT DOCUMENTS

| | | | |
|---|---|---|---|
| 6,167,379 A * | 12/2000 | Dean et al. | 705/9 |
| 6,192,346 B1 * | 2/2001 | Green | 705/9 |
| 6,278,978 B1 * | 8/2001 | Andre et al. | 705/9 |
| 6,289,340 B1 * | 9/2001 | Puram et al. | 707/5 |
| 6,334,133 B1 * | 12/2001 | Thompson et al. | 707/104.1 |
| 6,408,337 B1 * | 6/2002 | Dietz et al. | 709/229 |
| 6,578,005 B1 * | 6/2003 | Lesaint et al. | 705/8 |
| 6,587,831 B1 * | 7/2003 | O'Brien | 705/8 |
| 6,662,194 B1 * | 12/2003 | Joao | 707/104.1 |
| 6,823,315 B1 * | 11/2004 | Bucci et al. | 705/9 |
| 6,850,895 B2 * | 2/2005 | Brodersen et al. | 705/9 |
| 6,990,458 B2 * | 1/2006 | Harrison et al. | 705/8 |
| 7,058,589 B1 * | 6/2006 | Leamon et al. | 705/9 |
| 7,155,400 B1 * | 12/2006 | Jilk et al. | 705/9 |
| 7,155,519 B2 * | 12/2006 | Lo et al. | 709/227 |
| 2002/0016729 A1 * | 2/2002 | Breitenbach et al. | 705/9 |
| 2002/0040313 A1 * | 4/2002 | Hunter et al. | 705/9 |
| 2002/0065700 A1 * | 5/2002 | Powell et al. | 705/9 |
| 2002/0103691 A1 * | 8/2002 | Smith | 705/9 |
| 2003/0028410 A1 * | 2/2003 | House et al. | 705/9 |
| 2005/0114195 A1 * | 5/2005 | Bernasconi | 705/9 |

FOREIGN PATENT DOCUMENTS

| | | |
|---|---|---|
| JP | 07-129662 | 5/1995 |
| JP | 08-006995 | 1/1996 |
| JP | 9-293100 | 11/1997 |
| JP | 11-259566 | 9/1999 |
| JP | 11-338879 | 12/1999 |
| JP | 2001-265914 | 9/2001 |
| WO | WO 02/069231 A1 * | 9/2002 |

OTHER PUBLICATIONS

Holzberg, Carol, Visual Staff Scheduler Pro 3.0 Home Office Computing, Oct. 1997, vol. 15, No. 10, pp. 112, 114.*

Alison, Sprout, Scheduling forces with a PC Fortune, May 30, 1994, vol. 129, Issue 11.*

Scheduling Software Boots Efficiency, Saves Time and Money Schedule Soft Press Release, Oct. 2, 1998.*

Adaptiv.com Web Pages—WorkFORCE97 product pages Dec. 1997, Retrieved from Archive.org Jun. 23, 2005.*

Blue-Pumpkin Software Web Pages—Prime Time product pages Jan. 1998, Retrieved from Archive.org Jun. 23, 2005.*

Mizzisoft Web Pages Oct. 2000, Retrieved from Archive.org Jun. 23, 2005.*

Glover, Fred et al., The General Employee Scheduling Problem: An Integration of MS and AI Computer & Operations Research, vol. 13, No. 5, 1986, pp. 563-573.*

Ozkarahan, Irem, A Flexible Nurse Scheduling Support System Dissertation, Arizona State University, 1987, AAT 8711466, Abstract.*

Ozkarahan, Irem et al., Goal Programming Subsystem of A Flexible Nurse Scheduling Support System IIE Transactions, Sep. 1998, vol. 20, No. 3, pp. 306-316.*

High-tech staff scheduling for banks HR Banker, Mar. 1998, pp. 9-11.*

Thompson, Gary, Labor Scheduling Part 3 Cornell Hotel and Restaurant Administration Quaterly, Feb. 1990, vol. 40, No. 1, pp. 86-96.*

Irvin, Stephen et al., Self-scheduling with Microsoft Excel Nursing Economics, Jul./Aug. 1999, vol. 17, No. 4, pp. 201-206.*

Automating Peripherals Launches ActiveStaffer Business Wire, Nov. 2, 1999.*

Dowsland, KA et al., Solving a nurse scheduling problem with knapsacks, networks and tabu search Journal of Operational Research Society, vol. 51, 2000, pp. 825-833.*

ScheduleSoft.com Web Pages Sep. 1999-13 Apr. 2000, Retrieved from Archive. org Jan. 31, 2006.*

Richman, Dan, Microsoft Builds More Muscle in Wireless Internet Seattle Post Intelligencer, May 11, 1999.*

BellSouth Delivers the Internet to Wireless Phones; Customer Trial of Wireless Application Protocol (WAP) based services begins, PR Newswire, Sep. 22, 1999.*

Thompson, Gary, Controlling action times in daily workforce schedules Cornell Hotel and Restaurant Administration Quaterly, Apr. 1996, vol. 37, No. 2, pp. 82-96.*

Easton, F.E. et al., Overtime schedules for full-time service workers Omega, Jun. 1997, vol. 25, No. 3, Abstract.*

Thompson, Gary, Labor Scheduling Part 4 Cornell Hotel and Restaurant Administration Quaterly, Jun. 1999, vol. 40, No. 3, pp. 85-96.*

Pipkins Enhances Industry-Leading Workforce Management System with New Wireless Capability PR Newswire, Jan. 19, 2000.*

ABS-USA.com Web Pages Atlas Business Solutions, Inc., Nov. 1999, Retrieved from Archive.org Oct. 11, 2006.*

Pipkins.com Web Pages Pipkins, Inc., May 1998, Retrieved from Archive.org Oct. 10, 2006.*

Pipkins.com Web Pages Pipkins, Inc., Nov. 1999, Retrieved from Archive.org Oct. 10, 2006.*

Maxima Advantage Call Center CRM Solutions, Jan. 2000, vol. 18, No. 7, pp. 94-98.*

Visual Staff Scheduler Pro—Version 3.0 User Guide Atlas Business Solutions, Inc., 1997.*

Collins, John E. et al., Automated Assignment and Scheduling of Service Personnel IEEE, Apr. 1994, pp. 33-39.*

Kasavana, Michael L., Computers and Multiunit food-service operations Cornell Hotel & Restaurant Adminstration Quarterly, vol. 35, No. 3, Jun. 1994.*

Thompson, Gary M., Labor Scheduling: Part 2 Cornell and Restaurant Adminstration Quaterly, vol. 39, No. 6, 1998, pp. 26-37.*

Thompson, Gary M., Labor Scheduling: Part 3 Cornell Hotel and Restaurant Administration Quarterly, vol. 40, No. 1, Feb. 1999, pp. 86-96.*

DuCote, Grant et al., A Design of Personnel Scheduling Software for Manufacturing Computers & Industrial Engineering, vol. 37, 1999.*

Kronos Smart Scheduler: Frontline Labor Management Enterprise Inforrmation Kronos, Inc., 1999, Retrieved from Archive.org.*

PrimeTime F&S User's Guide—Version 1.3 Blue Pumpkin Software, Inc. 1997-1998.*

* cited by examiner

| | | | | | | | |
|---|---|---|---|---|---|---|---|
| DATE OF CONTRACT | | ID | | | PASSWORD | | |
| NAME | | | NAME (KANA) | | | | |
| ZIP CODE | | ADDRESS DISPLAY | | | | | |
| ADDRESS | | | | | | | |
| DATE OF BIRTH | | AGE | | COMMUTING TIME | | | |
| SEX | ● MALE ○ FEMALE | OCCUPATION | | | | | |
| TEL (HOME) | | TEL (PORTABLE) | | | | | |
| E-MAIL ADDRESS (PORTABLE) | | | | | | | |
| E-MAIL ADDRESS (PC) | | | | | | | |
| QUALIFICATIONS | xxxxxx, xxxxx, xxxxx | | | | | | |
| REWARD AND PENALTY INFORMATION | | | | | | | |

| WORKING DAYS | ☐ SUN | ☐ MON | ☐ TUE | ☐ WED | ☐ THU | ☐ FRI | ☐ SAT |
|---|---|---|---|---|---|---|---|
| WORK STARTING TIME | | | | | | | |
| WORK STARTING TIME | | | | | | | |
| WORKING DAYS | ☐ SUN | ☐ MON | ☐ TUE | ☐ WED | ☐ THU | ☐ FRI | ☐ SAT |
| WORK STARTING TIME | | | | | | | |
| WORK STARTING TIME | | | | | | | |

| | | | |
|---|---|---|---|
| WAGE PER HOUR | | COMMUTATION ALLOWANCE | |
| DESIRED MAXIMUM YEARLY INCOME | | DESIRED MAXIMUM MONTHLY INCOME | |
| DESIRED MINIMUM YEARLY INCOME | | DESIRED MINIMUM MONTHLY INCOME | |
| TYPE OF JOB | | RANK | |
| GROUP | | | |
| WORK MANAGEMENT | | | |
| ACTUAL WORKING HOURS | | PERSONAL EXPENSE | |
| TEMPORARY SHIFT INDICATION | ☐ | WAGE RAISING CALCULATION | ☐ |

REGISTER B17  BACK B18

FIG. 5

| DATE OF CONTRACT | | ID | | PASSWORD | |
|---|---|---|---|---|---|
| NAME | | NAME (KANA) | | | |
| ZIP CODE | | ADDRESS DISPLAY | | | |
| ADDRESS | | | | | |
| DATE OF BIRTH | | AGE | | COMMUTING TIME | |
| SEX | ● MALE ○ FEMALE | OCCUPATION | | | |
| TEL (HOME) | | TEL (PORTABLE) | | | |
| E-MAIL ADDRESS (PORTABLE) | | | | | |
| E-MAIL ADDRESS (PC) | | | | | |
| QUALIFICATIONS | xxxxxx, xxxxx, xxxxx | | | | |
| REWARD AND PENALTY INFORMATION | | | | | |

| WORKING DAYS | ☐ SUN | ☐ MON | ☐ TUE | ☐ WED | ☐ THU | ☐ FRI | ☐ SAT |
|---|---|---|---|---|---|---|---|
| WORK STARTING TIME | | | | | | | |
| WORK STARTING TIME | | | | | | | |
| WORKING DAYS | ☐ SUN | ☐ MON | ☐ TUE | ☐ WED | ☐ THU | ☐ FRI | ☐ SAT |
| WORK STARTING TIME | | | | | | | |
| WORK STARTING TIME | | | | | | | |

| WAGE PER HOUR | | COMMUTATION ALLOWANCE | |
|---|---|---|---|
| DESIRED MAXIMUM YEARLY INCOME | | DESIRED MAXIMUM MONTHLY INCOME | |
| DESIRED MINIMUM YEARLY INCOME | | DESIRED MINIMUM MONTHLY INCOME | |
| TYPE OF JOB | | RANK | |
| GROUP | | | |
| WORK MANAGEMENT | | | |
| ACTUAL WORKING HOURS | | PERSONAL EXPENSE | |
| TEMPORARY SHIFT INDICATION | ☐ | WAGE RAISING CALCULATION | ☐ |
| RETRIEVAL KEY | | NAME | NAME (KANA) |

[ PREVIOUS DATA ] B19 [ NEXT DATA ] B20 [ CORRECT ] B21 [ DELETE ] B22 [ BACK ] B18

FIG. 6

TIME SETTING SCREEN

| TIME OF URGENT ARRANGEMENT | [ ] DATE [ ] : [ ] AM/PM |
| WANT DEADLINE | [ ] DATE [ ] : [ ] AM/PM |
| E-MAIL SENDING TIME | [ ] : [ ] AM/PM |
| PERIOD OF SHIFT MADE | ● ONE MONTH  ○ TWICE A MONTH  ○ ONE WEEK |

B23 [SET]   B24 [BACK]

FIG. 7

WAGE-RAISE SETTING SCREEN

TYPE OF JOB [                    ]  [DISPLAY]

[        ] HOURS OR MORE  [        ] YEN

[        ] HOURS OR MORE  [        ] YEN

[        ] HOURES OR MORE [        ] YEN

[        ] HOURS OR MORE  [        ] YEN

[        ] HOURS OR MORE  [        ] YEN

[SET] B25    [BACK] B26

FIG. 8

GROUP SETTING SCREEN

```
┌─ TYPE OF JOB ──────────────────────────────┐
│ NAME OF  ┌──────┐                          │
│ JOB TYPE └──────┘          ┌─────────┐     │
│                            │ REGISTER│     │
│ JOB TYPE ┌──────┐          └─────────┘     │
│ SYMBOL   └──────┘          ┌─────────┐     │
│                            │ CORRECT │     │
│                            └─────────┘     │
│                            ┌─────────┐     │
│                            │ DELETE  │     │
│                            └─────────┘     │
└────────────────────────────────────────────┘

┌─ GROUP ─────────────────┐
│  ○ TYPE OF JOB  ○ EXPERIENCE │
│                               ┌─────────┐ ┌──────┐
│  ● TIME ZONE    ○ RANK        │ REGISTER│ │ BACK │
│                               └─────────┘ └──────┘
└─────────────────────────┘
```

FIG. 10

PRIORITY-ORDER SETTING SCREEN

GROUP [          ]

HIGH PRIORITY ORDER
- ● RANK OF WORK EXPERIENCE
- ○ ACTUAL WORKING
- ○ QUALIFICATIONS
- ○ WAGE PER HOUR
- ○ TIME ZONE  ☐ HIGH  ☐ LOW

INTERMEDIATE PRIORITY ORDER
- ○ RANK OF WORK EXPERIENCE
- ○ ACTUAL WORKING
- ○ QUALIFICATIONS
- ○ WAGE PER HOUR
- ○ TIME ZONE  ☐ HIGH  ☐ LOW

LOW PRIORITY ORDER
- ○ RANK OF WORK EXPERIENCE
- ○ ACTUAL WORKING
- ○ QUALIFICATIONS
- ○ WAGE PER HOUR
- ○ TIME ZONE  ☐ HIGH  ☐ LOW

[ SET ]   [ BACK ]

FIG. 11

NUMBER-OF-PERSONS SETTING SCREEN

| SUNDAY ▼ | | | TYPE OF JOB ▼ | | | | |
|---|---|---|---|---|---|---|---|

| HOURS | 0 | 1 | 2 | 3 | 4 | 5 | 6 | 7 |
|---|---|---|---|---|---|---|---|---|
| NUMBER | 2 | 2 | 2 | 2 | 2 | 2 | 2 | 2 |
| HOURS | 8 | 9 | 10 | 11 | 12 | 13 | 14 | 15 |
| NUMBER | 2 | 2 | 2 | 2 | 3 | 3 | 3 | 3 |
| HOURS | 16 | 17 | 18 | 19 | 20 | 21 | 22 | 23 |
| NUMBER | 2 | 2 | 2 | 2 | 2 | 2 | 2 | 2 |

REGISTER　　BACK

FIG. 13

EVENT SETTING SCREEN

| | | | | | | | | |
|---|---|---|---|---|---|---|---|---|
| 3 MONTH | 16 DATE | TYPE OF JOB ▼ | | | | | | |
| HOURS | 0 | 1 | 2 | 3 | 4 | 5 | 6 | 7 |
| NUMBER | 2 | 2 | 2 | 2 | 2 | 2 | 2 | 2 |
| HOURS | 8 | 9 | 10 | 11 | 12 | 13 | 14 | 15 |
| NUMBER | 2 | 2 | 2 | 2 | 3 | 3 | 3 | 3 |
| HOURS | 16 | 17 | 18 | 19 | 20 | 21 | 22 | 23 |
| NUMBER | 2 | 2 | 2 | 2 | 2 | 2 | 2 | 2 |

REGISTER   BACK

NETWORK BASED WORK SHIFT SCHEDULE GENERATION UTILIZING A TEMPORARY WORK SHIFT SCHEDULE

CROSS-REFERENCE TO RELATED DOCUMENTS

This application is based on Japanese Patent Application No.2000-089989 filed on Mar. 29, 2000, and including specification, claims, drawings and summary. The disclosure of the above Japanese Patent Application is hereby incorporated herein by reference in its entirety.

BACKGROUND OF THE INVENTION

1. Field of the Invention

The present invention relates to a system and method for managing working time schedules of employees and, more particularly, to a system and method which secure required labors easily and adequately and manages working time schedules of employees.

2. Discussion of the Background

Businesses, such as shops, which have long working hours often provide temporary labors by means of part-timer workers or the like. Such temporary employees each specify working hours beforehand to make up adequate shifts, and to properly allocate labors. A person in charge who makes a final decision on the working hours for each temporary employee would organize shifts in consideration of the possible working hours of the individual employees.

Conventionally, at the time of making shifts, a person in charge decides the working hours of the individual employees by handing out to each employee a memo indicating the schedule of working hours and hearing about the desired working hours from each employee, or allowing each employee to write their desired working hours on a white board or the like.

With the conventional scheme, a person in charge spends time in making shifts due to the troublesome work of creating memos that show the schedules of working hours.

At the time of determining working hours employee by employee by hearing about the desired working hours from each employee or allowing each employee to write their desired working hours on a white board or the like, a person in charge may not fully hear, may misunderstand, or may misread the written working hours. This will result in improper shift scheduling.

Further, if an employee suddenly becomes unavailable and unable to make their scheduled working hours just before the working hours start or in a similar case, the conventional scheme requires that a person in charge would have to make several calls to other employees to adjust the working schedules and ask them to work in place of the unavailable employee.

Furthermore, hiring new personnel requires troublesome works in addition to the ordinary works, such as requesting an advertisement agency to make a want ad.

SUMMARY OF THE INVENTION

Accordingly, it is an object of the present invention to provide a system and method which can secure required labors easily and adequately and manage working time schedules of individual employees.

It is another object of the present invention to provide a system and method which can manage working staffs easily.

To achieve the above objects, according to the first aspect of the present invention there is provided a work management system having a work management apparatus for transmitting and receiving information, over a network, between a plurality of user terminals. The work management apparatus includes a file memory which stores an employee information file retaining employee information (personal information) on employees, and a work management file retaining management information for setting work contents of the employees. Further, a controller generates working schedule information indicating working schedules of the employees based on the employee information and management information, and sends the generated working schedule information to the user terminals over the network.

According to this invention, it is possible to generate working schedule information indicating working schedules of the employees based on the employee information and work management information, and send the generated working schedule information to the user terminals over the network. This system can reliably notify each employee of the working schedule and can secure required labors properly and easily. This contributes to easy management of the working time schedules of individual employees and to easy running of shops, stores, or any other work environment.

It is desirable that the plurality of user terminals can transmit cancellation information for canceling the working schedules specified by the working schedule information sent from the work management apparatus, and that upon reception of the cancellation information from the plurality of user terminals, the controller can generate recruitment information for recruiting a substitute employee who can work in a time slot for which cancellation has been made, and can then send the recruiting information to the user terminals over the network.

When a scheduled work is canceled, therefore, the above feature can permit a person in charge to quickly find a substitute employee, thus making it possible to keep required labors adequately and easily.

It is further desirable that upon reception of the cancellation information indicating cancellation of the working schedules from the plurality of user terminals, the controller should generate hiring information for hiring an additional employee and send the hiring information to the user terminals over the network.

When a labor shortage occurs, therefore, this feature makes it possible to quickly employ a new employee, thereby ensuring adequate and easy securing of required labors.

It is further desirable that the controller should generate format information for defining a format of a curriculum vitae, send the format information together with the hiring information to the user terminals, extract at least a portion of employee information from information on the curriculum vitae sent from the user terminals, and retain the extracted employee information in the employee information file.

It is preferable that in any one of the above-described modes, the plurality of user terminals should transmit information for approving working time schedules specified by the working schedule information sent from the work management apparatus, and that upon reception of the accepting information from the plurality of user terminals, the controller should generate working shift information indicating a work shift table in which employees information is set in an approved time slot and retain the shift information in a shift information file to be stored in the file memory.

It is further preferable that the controller should send the working shift information to the user terminals over the network.

It is desirable that the work management apparatus according to any one of the above-described modes should further include a display which displays a screen (setting screen or input screen) for accepting input of information for the employee information and the management information, and an instruction input unit which inputs an instruction, and that the controller should control the display unit to display the screen in response to instructions input from the instruction input unit, accept information input through the screen, and store the employee information in the employee information file and the management information in the work management file. The employee information and the management information may be input in the screen directly, or the controller can generate the employee information and the management information based on the information input through the screen.

It is desirable that the work management system according to any one of the above-described modes should further include a mail server connected to the network, and that the work management apparatus and the plurality of user terminals should send electronic mails to the mail server and receive electronic mails from the mail server to thereby exchange information over the network. For example, the working schedule information, the cancellation information, the recruiting information, the hiring information, the format information, etc. is transmitted by electronic mails between the work management apparatus and the terminals through the mail server.

It is desirable that the work management system according to any one of the above-described modes should further include a Web (WWW) server connected to the network, and that the controller should send desired information such as the working schedule information, the hiring information, and the format information to the Web server. The Web server opens received information in such a way as to be referable on a Web.

According to a second aspect of the present invention, there is provided a work management apparatus for generating a work shift table indicating working time schedules of employees, which includes a communication unit which exchanges information with user terminals over a network. A file memory stores an employee information file retaining employee information on employees and a work management file retaining management information for setting work contents of the employees. A controller generates a shift table, based on the employee information and management information stored in the file memory, indicating working time schedules of the employees, and sending information for notifying user terminals of the shift table from the communication unit.

According to this aspect of the invention, it is possible to generate a shift table indicating working time schedules of the employees based on the employee information and the management information, and send information for notifying the user terminals of the shift table from the communication unit.

This apparatus can reliably notify each employee of the working schedule and can secure required labors properly and easily. This will lead to easy management of the working time schedules of individual employees.

It is desirable that the work management apparatus should further include a display unit which displays an input (setting) screen accepting input of information for generating the employee information to be retained in the employee information file and the management information to be retained in the work management file and an instruction input unit which inputs a predetermined instruction. Further, the controller should control the display unit to display the input screen in response to the predetermined instructions input from the instruction input unit and generate the employee and management information in accordance with information input through the input screen, and store the generated employee and management information in the employee and work management files, respectively.

It is desirable that according to any one of the modes of the second aspect, upon reception of cancellation information for canceling the work schedules from the user terminals, the controller should generate recruiting information for recruiting a substitute employee who can work in a time slot for which cancellation has been made and send the recruiting information to the user terminals from the communication unit.

It is desirable that according to any one of the modes of the second aspect, upon reception of the cancellation information indicating cancellation of the working schedules from the user terminals, the controller should generate hiring information for hiring an additional employee and send the hiring information to the user terminals from the communication unit.

It is further desirable that the controller should generate format information for defining a format of a curriculum vitae, send the format information together with the hiring information to the user terminals, extract at least a portion of employee information of employees from information on the curriculum vitae sent from the user terminals, and retain the extracted employee information in the employee information file to be stored in the file storage memory.

It is preferable that according to any one of the above-described modes of the second aspect, upon reception of information for approving working time schedules from the user terminals, the controller should generate work shift information indicating a work shift table in which employee information is set in an accepted time slot and retain the work shift information in the shift information file.

It is further preferable that the controller should send the shift work information retained in the shift information file to the user terminals from the communication unit.

According to a third aspect of the invention, there is provided a work management method which stores employee information on employees and work management information for setting work contents of the employees, generates working schedule information indicating working time schedules of the employees based on the employee information and the management information, and transmits the generated working schedule information over a network.

The work management method may further transmit cancellation information indicating cancellation of the working time schedules specified by the working schedule information, and upon reception of the cancellation information, generate recruiting information for additionally recruiting an employee who can work in a time slot for which cancellation has been made, and send the recruiting information over the network. The recruiting information may include information for hiring an additional employee.

The work management method may further generate format information for defining a format of a curriculum vitae and send the format information together with sending of the hiring information, extract at least a portion of the employee information on the curriculum vitae from information sent from user over network, and retain the received information.

The work management method may further transmit approving information, approving working time schedules specified by the working schedule information, from the user terminals, and upon reception of the approving information from the plurality of user terminals, generate shift information indicating a shift table in which employees are set in an approved time slot, and retain that information in the shift information file.

The work management method may further send the shift information over the network.

The work management method may further display a setting screen for generating the employee information and the management information, input information in the setting screen, and generate the employee information and management information based on information input in the setting screen.

The working schedule information may be transmitted based on Hyper Text Transfer Protocol.

The information may be transmitted by electronic mails.

According to a fourth aspect of the invention, there is provided a program for allowing a computer to function as a file storage for storing an employee information file retaining employee information on employees, and a work management file retaining management information for setting work contents of employees. A controller generates a shift table indicating working time schedules of the employees and sends information for notifying the user terminals of the shift table.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein:

FIG. 5 is a diagram exemplifying a personal-data registration screen according to the present invention;

FIG. 6 is a diagram exemplifying a personal-data correction/deletion screen according to the present invention;

FIG. 7 is a diagram exemplifying a time setting screen according to the present invention;

FIG. 8 is a diagram exemplifying a wage-raise setting screen according to the present invention;

FIG. 10 is a diagram exemplifying a group setting screen according to the present invention;

FIG. 11 is a diagram exemplifying a priority-order setting screen according to the present invention;

FIG. 13 is a diagram exemplifying a number-of-persons setting screen according to the present invention;

FIG. 14 is a diagram exemplifying an event setting screen according to the present invention;

FIG. 17 is a diagram exemplifying a temporary-shift-table checking screen according to the present invention;

DESCRIPTION OF THE PREFERRED EMBODIMENTS

Figure 1:
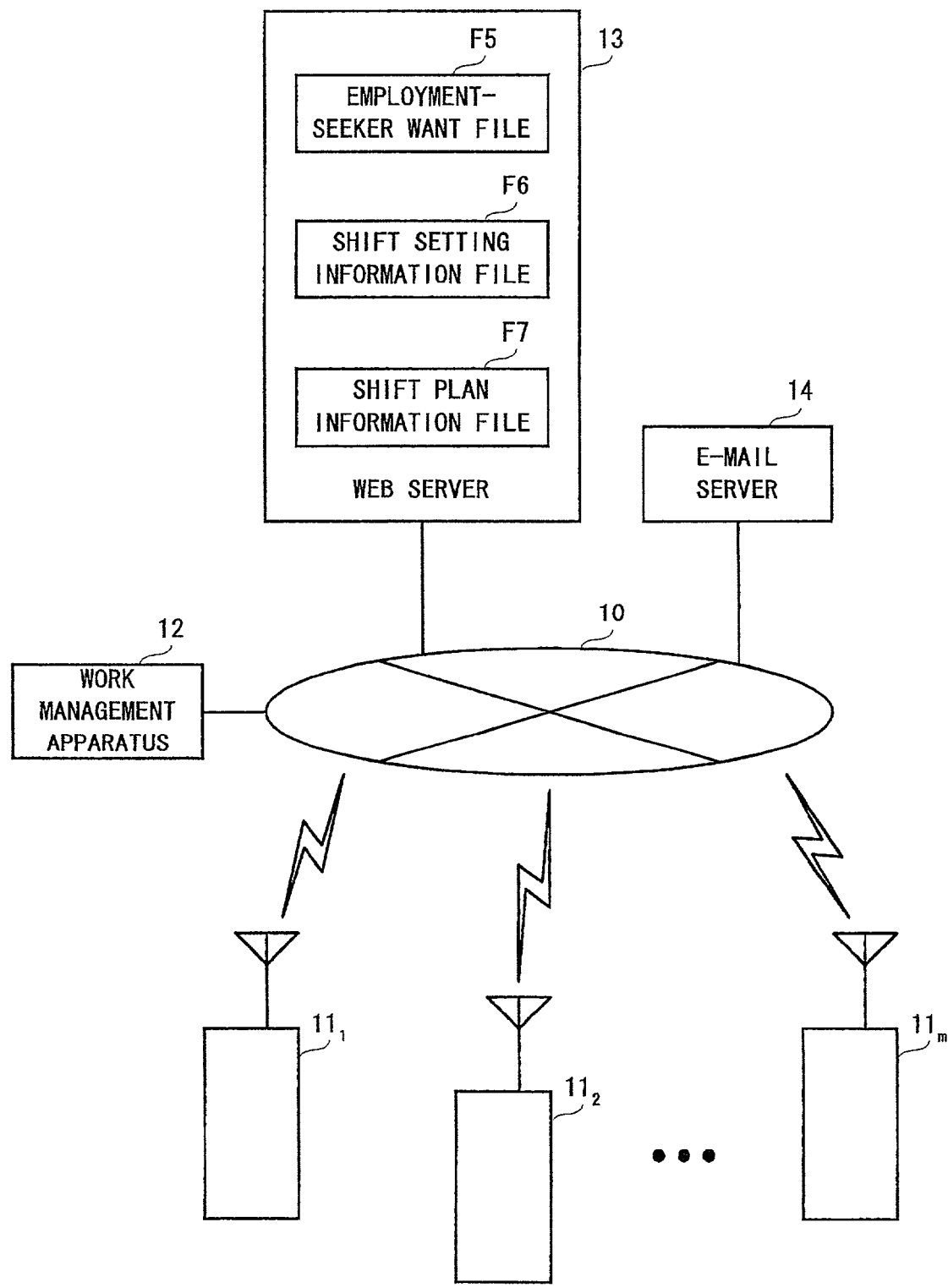
FIG. 1 is a diagram illustrating the structure of a work management system according to one embodiment of the invention.

A work management system (or staff management system) according to one embodiment of the present invention will now be described in detail with reference to the accompanying drawings, in which like reference numerals designate identical or corresponding parts throughout the views.

FIG. 1 is a diagram illustrating the structure of the work management system according to an embodiment of the invention.

As illustrated, the work management system includes user terminals $11_1$ to $11_m$ (m being an arbitrary natural number) mutually connected over a network 10, a work management apparatus 12, a Web server 13, and an e-mail server 14.

The network 10 can be built by a LAN (Local Area Network), telephone lines, a mobile communication network, and so forth. The network 10 can allow the user terminals $11_1$-$11_m$ and the work management apparatus 12 to exchange information.

The user terminals $11_1$-$11_m$ include portable terminal units such as mobile telephone units that can read Web pages, personal computers, or the like. The user terminals $11_1$-$11_m$ communicate with the work management apparatus 12 over the network 10.

The user terminals $11_1$-$11_m$, which are carried around by, for example, temporary employees, such as part-timer workers, can read files stored in the Web server 13. Each of the user terminals $11_1$-$11_m$ can read an electronic mail or e-mail stored in an associated mail box in the mail server 14 and can send an e-mail to the mail server 14.

The work management apparatus 12 is sited in a store or other business which does a business of, for example, selling goods by using temporary employees, such as part-time workers. The work management apparatus 12 communicates with the user terminals $11_1$-$11_m$ over the network.

Figure 2:
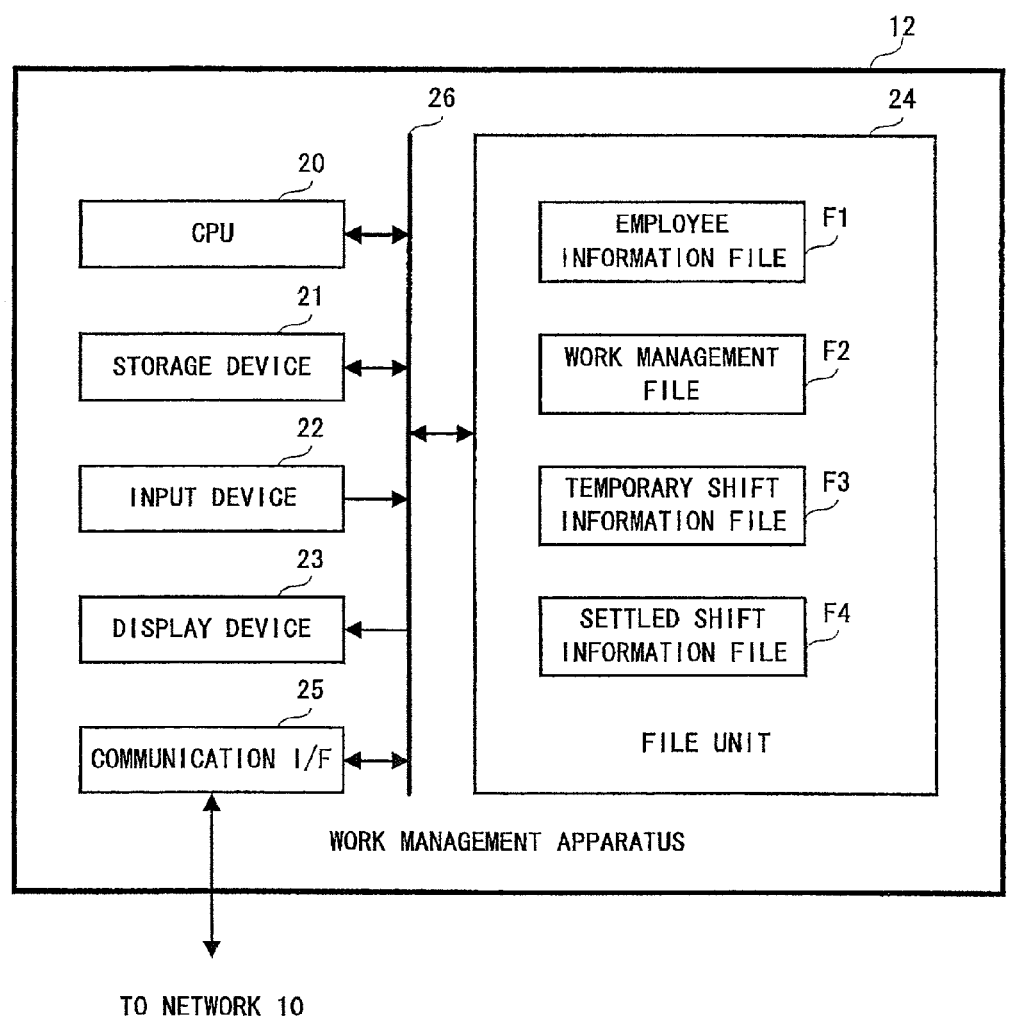
FIG. 2 is a diagram illustrating the structure of a work management apparatus according to the present invention.

FIG. 2 is a diagram illustrating the structure of the work management apparatus 12.

As illustrated, the work management apparatus 12 includes a central processing unit (CPU) 20, a storage device 21, an input device 22, a display device 23, a file unit 24, a communication interface (I/F) 25, and a bus 26 which connects those components.

The CPU 20, which is formed of a microprocessor or the like, controls the general operation of the work management apparatus 12 and performs processes, such as alteration of files stored in the file unit 24, in accordance with a program stored in the storage device 21.

The storage device 21, which is formed of a RAM (Random Access Memory) or the like, serves as a main memory, a work area, and so forth for the CPU 20.

The input device 22, which is formed of a keyboard, a mouse, or the like, is used to input instruction information that instructs the operation of the work management apparatus 12 and data, such as character codes.

The display device 23, which is formed of a CRT (Cathode Ray Tube) display, LCD (Liquid Crystal Display), or the like, displays GUI (Graphical User Interface) screens for facilitating the input process and various process results.

The file unit 24, which is formed of an auxiliary storage device such as a magnetic disk, optical disk, etc. stores an employee information file F1, a work management file F2, a temporary shift information file F3, and a settled shift information file F4. The employee information file F1 holds information on each employee (personal information). For example, the employee information file F1 stores information indicating the name, age, sex, address and qualifications of each employee, workable time slots, the type of job, hourly wage, etc. The CPU 20 organizes the employee information file F1 in such a way that the employees are distinguishable, and stores the file F1 in the file unit 24.

The work management file F2 is created by the CPU 20 in accordance with an instruction from a person in charge or the like who decides the working hours for each employee. The work management file F2 stores information (staff management information) for setting the work contents of employees, such as the number of workers needed for each hour, the contents of job or task of employees, and the work days of the business, etc.

The temporary shift information file F3 is generated based on the employee information file F1 and the work management file F2, and stores information for the employees to register their working time schedules. For example, the temporary shift information file F3 stores information which associates the time slots where labors of employees become necessary with the number of required persons. The CPU 20 stores the temporary shift information file F3 in the file unit 24 and transfers the file F3 to the user terminals $11_1$-$11_m$.

The temporary shift information file F3 is sent to the web server 13 and is stored and distributed as a shift setting information file F6 with a format that can be referred to on a Web.

When the working hours of each employee are registered in response to an instruction from the user terminals $11^1$-$11_m$ or the input device 22 and labors to be needed are secured, the CPU 20 generates the settled shift information file F4 as a file to store information which specifies employees to work hour by hour. The settled shift information file F4 is stored in the file unit 24 and is sent to the Web server 13 to be stored and distributed as a shift plan information file F7 with a format that can be referred to on a Web.

The Web server 13 is a Web document storing and distributing unit which is typified by a work station. The Web server 13 stores the employment-seeker want file F5, the shift setting information file F6, and the shift plan information file F7 or Web documents received from the work management apparatus 12. The Web server 13 is a sort of database which stores those files and distributes the files to the user terminals $11_1$-$11_m$ using the Internet or the like.

The employment-seeker want file F5 is generated in accordance with the registration work done by the work management apparatus 12, and includes a document file which includes information for recruiting a new employee transformed into a type which can be referred to on a Web by the user terminals $11_1$-$11_m$.

The shift setting information file F6 is a document file which includes the temporary shift information file F3 transformed into a type which can be referred to on a Web and allows the users to check how the working hours are set using the user terminals $11_1$-$11_m$.

The shift plan information file F7 is a document file which includes the settled shift information file F4 transformed into a type which can be referred to on a Web and allows the users to check the organized shifts using the user terminals $11_1$-$11_m$.

The mail server 14 is an e-mail storing and transferring unit which is typified by a work station. The mail server 14 decodes the destination mail address of an e-mail received over the network 10 and stores the e-mail in the destination mail box if the mail box is located in the server itself. When the destination mail box is located in another server, the mail server 14 transfers the e-mail to that server. When the destination mail box is not found, the mail server 14 generates an e-mail informing of that result and stores it in the sender's mail box.

The operation of the work management system according to the embodiment of the invention will be discussed below.

The work management system is activated as, for example, a person in charge who determines the working hours employee by employee selects an activation icon displayed on the display device 23 that constitutes the work management apparatus 12 sited in a business.

Figure 3:
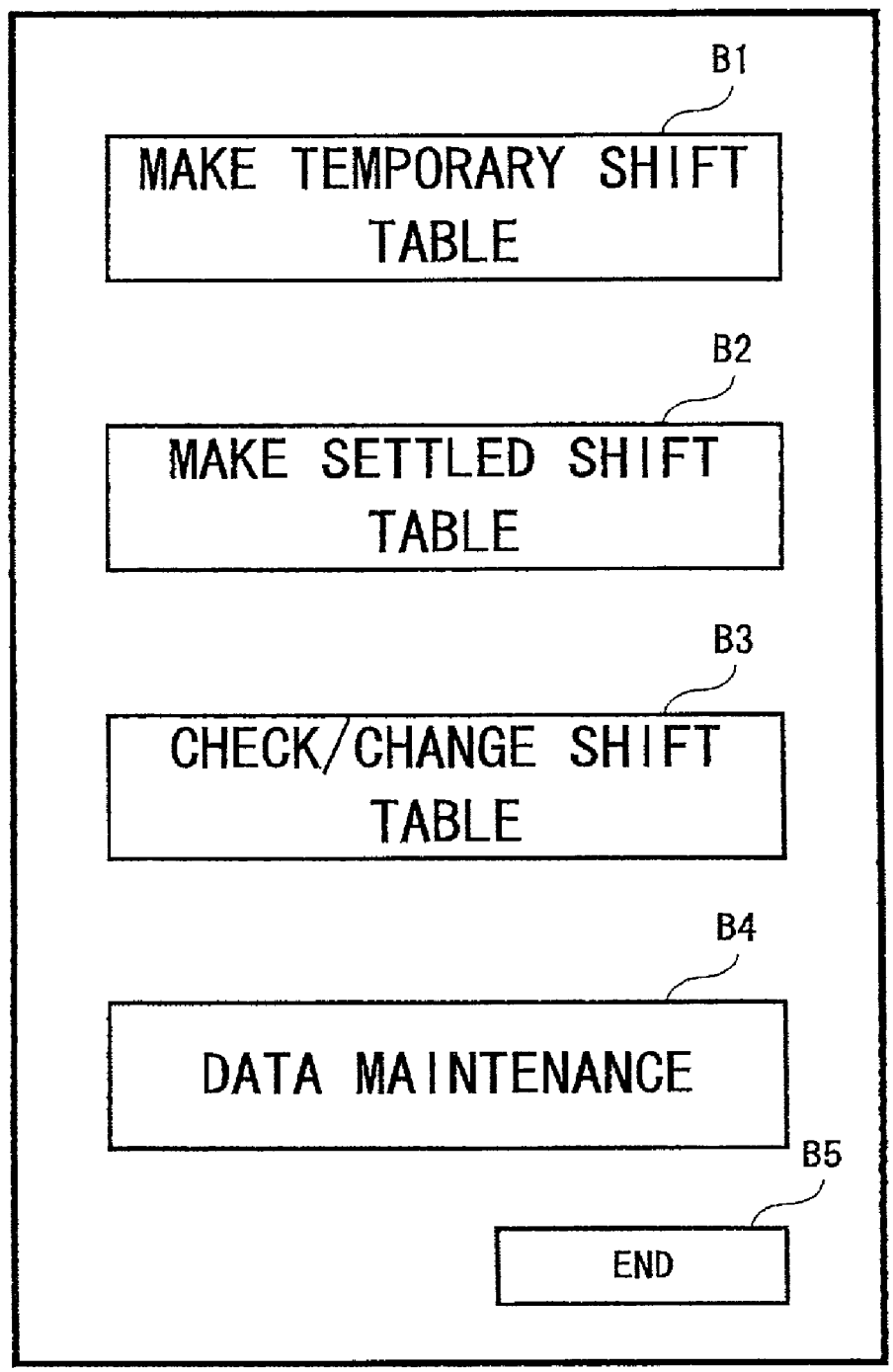
FIG. 3 is a diagram exemplifying a main menu screen according to the present invention.

When the activation icon is selected through the input device 22, the CPU 20 displays the main menu screen as exemplified in FIG. 3 on the display device 23.

The main menu screen shows a MAKE TEMPORARY SHIFT TABLE button B1, a MAKE SETTLED SHIFT TABLE button B2, a CHECK/CHANGE SHIFT TABLE button B3, a DATA MAINTENANCE button B4, and an END button B5.

To register information about an employee, for example, the person in charge instructs the depression of the DATA MAINTENANCE button B4 by manipulating the input device 22. When detecting that the depression of the DATA MAINTENANCE button B4 has been instructed, the CPU 20 displays a data maintenance screen as exemplified in FIG. 4 on the display device 23.

The data maintenance screen has a "personal data" area for registering and retrieving personal data on employees, a "shop data" area for setting the unit of a period for making a shift, the date on which the shift is made, etc., a "group data" area for grouping the employees for the types of job determined in the store and the workable time slots, and a "calendar data" area for setting the working hours of the business, e.g. shop or store, the number of persons needed for each hour, a schedule for an event (a schedule which requires alteration of the number of persons), and so forth.

To register information on an employee, the person in charge instructs the depression of a REGISTER button B6 shown in the "personal data" area by manipulating the input device 22.

When detecting that the depression of the DATA MAINTENANCE button B4 has been instructed, the CPU 20 executes an access permission/denial process, such as a log-in process, then displays a personal-data registration screen as exemplified in FIG. 5.

By manipulating the input device 22, the person in charge inputs information on the employee, such as the name, age, sex, address, mail address, and qualifications of the employee, the workable time slots, the type of job, the hourly wage, etc. and instructs the depression of a REGISTER button B17 on the personal-data registration screen.

To cancel the registration, the person in charge manipulates the input device 22 to instruct the depression of a BACK button B18 on the personal-data registration screen.

In response to the instruction, the CPU 20 displays the data maintenance screen shown in FIG. 4 again on the display device 23.

When detecting that the depression of the REGISTER button B17 on the personal-data registration screen has been instructed, the CPU 20 displays a screen for selecting whether or not to register information on the employee on the display device 23, prompting the person in charge to make the selection. Upon reception of the instruction to register through the input device 22, the CPU 20 reads data of items input on the personal-data registration screen shown in FIG. 5 and stores the data in the employee information file F1 in a form identifiable for each employee.

The information on each employee is registered in the work management system and stored in the employee information file F1 in this way.

Figure 4:
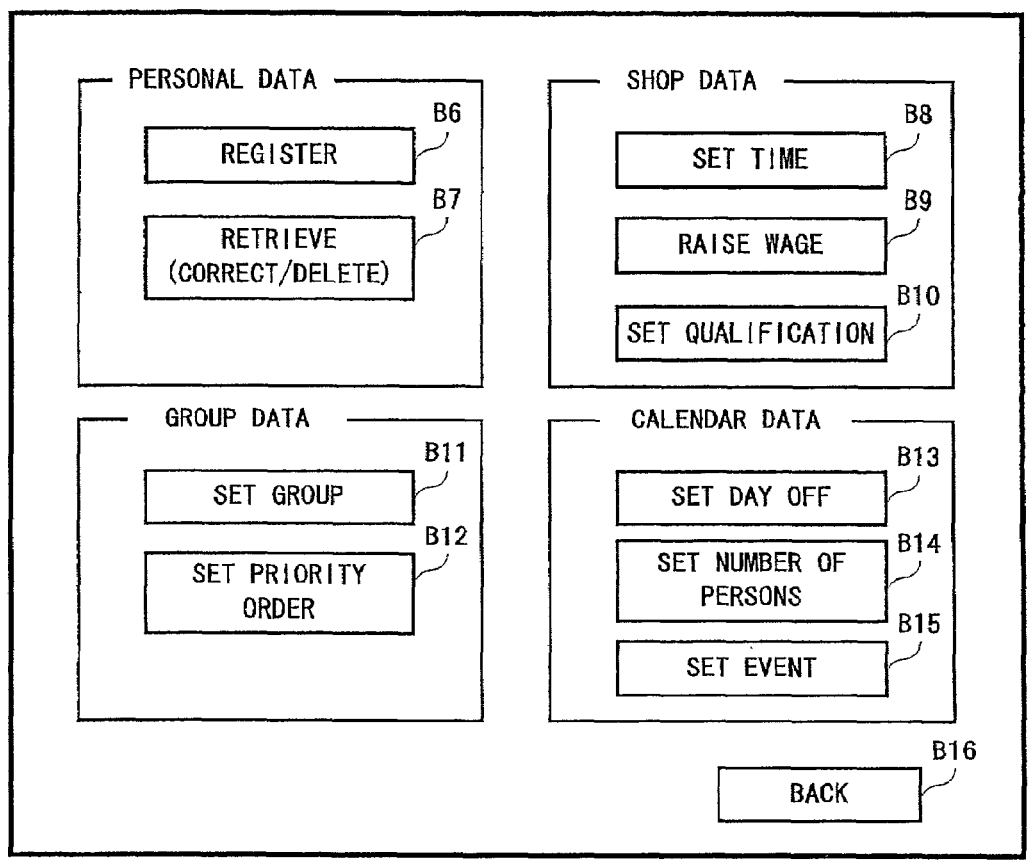
FIG. 4 is a diagram exemplifying a data maintenance screen according to the present invention.

The information on the employees stored in the employee information file F1 can be read, corrected, or subjected to other process by the work management apparatus 12. In this case, while the data maintenance screen shown in FIG. 4 is displayed on the display device 23, the person in charge instructs the depression of a RETRIEVE button B7 shown in the "personal data" area by manipulating the input device 22. When detecting that the depression of the RETRIEVE button B7 has been instructed, the CPU 20 displays a personal-data correction/deletion screen as exemplified in FIG. 6 on the display device 23.

The personal-data correction/deletion screen shown in FIG. 6, which is almost identical to the personal-data registration screen shown in FIG. 5, has a "retrieval key" item to enter a retrieval key, a PREVIOUS DATA button B19 and a NEXT DATA button B20 for displaying information on the employees stored in the employee information file F1 one at a time.

The personal-data correction/deletion screen shown in FIG. 6 further has a CORRECT button B21 for instructing the correction of information on an employee and a DELETE button B22 for instructing the deletion of information. Accordingly, the person in charge can correct or delete registered information on any employee.

To set the unit of a period over which a shift is to be made, the date on which the shift making is to be completed, etc., for example, the person in charge instructs the depression of a button shown in the "shop data" area by manipulating the input device 22 while the data maintenance screen shown in FIG. 4 is displayed on the display device 23.

In a case that a working schedule is canceled by an employee for some reason, for example, to set the working date on which the person in charge should urgently ask another employee to work, the person in charge instructs the depression of a SET TIME button B8 shown in the "shop data" area by manipulating the input device 22.

When detecting that the depression of the SET TIME button B8 has been instructed, the CPU 20 displays a time setting screen as exemplified in FIG. 7.

This time setting screen of FIG. 7 is for setting the working date on which the person in charge should urgently ask an employee to work, the deadline for accepting information indicating the desired working date for each employee sent from the user terminals $11_1$-$11_m$ at the time of making a shift, and the transmission time for sending an e-mail to the user terminals $11_1$-$11_m$ at the time of making a shift.

By inputting data in the items shown on the time setting screen shown in FIG. 7 and instructing the depression of a SET button B23, the person in charge can make a setting on the time when the work management apparatus operates.

When the depression of the SET button B23 is instructed, the CPU 20 reads data on the items input on the time setting screen and stores the data in the work management file F2. When the depression of a BACK button B24 is instructed through the input device 22 in the screen of FIG. 7, the CPU 20 displays the data maintenance screen shown in FIG. 4 again on the display device 23.

Suppose that while the data maintenance screen shown in FIG. 4 is displayed on the display device 23, the person in charge instructs the depression of a RAISE WAGE button B9 shown on the "shop data" area by manipulating the input device 22. In this case, the CPU 20 displays a wage-raise setting screen as exemplified in FIG. 8 on the display device 23 and sets an hourly wage according to the number of working hours.

When, in the screen of FIG. 8, the depression of a SET button B25 is instructed through the input device 22, the CPU 20 reads data on the items input on the wage-raise setting screen and stores the data in the work management file F2. When the depression of a BACK button B26 is instructed through the input device 22, the CPU 20 displays the data maintenance screen shown in FIG. 4 again on the display device 23.

Suppose that while the data maintenance screen shown in FIG. 4 is displayed on the display device 23, the person in charge instructs the depression of a SET QUALIFICATION button B10 shown on the "shop data" area by manipulating the input device 22. In this case, the CPU 20 displays a qualification setting screen as exemplified in FIG. 9 to permit the setting of qualifications (e.g., qualified chef) required to run the store.

Figure 9:
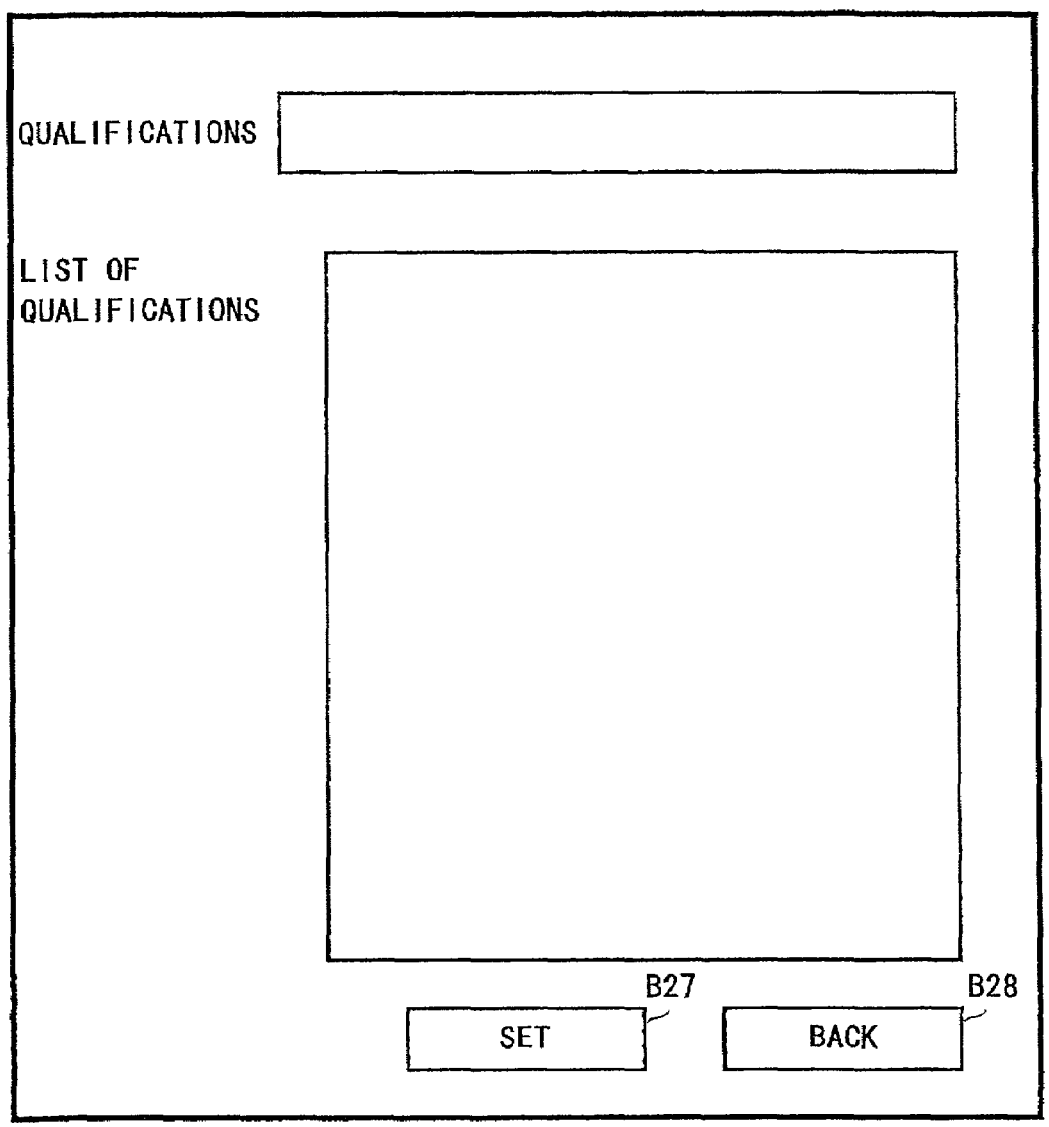
FIG. 9 is a diagram exemplifying a qualification setting screen according to the present invention.

When, in the screen of FIG. 9, the depression of a SET button B27 is instructed through the input device 22, the CPU 20 reads data on the items input on the qualification setting screen and stores the data in the work management file F2. When the depression of a BACK button B28 is instructed through the input device 22, the CPU 20 displays the data maintenance screen shown in FIG. 4 again on the display device 23.

Suppose that while the data maintenance screen shown in FIG. 4 is displayed on the display device 23, the person in charge instructs the depression of a SET GROUP button B11 shown on the "group data" area by manipulating the input device 22. In this case, the CPU 20 displays a group setting screen as exemplified in FIG. 10 on the display device 23. This group setting screen of FIG. 10 is for inputting information for grouping employees according to given standards, such as the types of job (e.g., a hall, front, kitchen and security personnel) specified in a store or the like and workable time slots.

Suppose that while the data maintenance screen shown in FIG. 4 is displayed on the display device 23, the person in charge instructs the depression of a SET PRIORITY ORDER button B12 shown on the "group data" area by manipulating the input device 22. In this case, the CPU 20 displays a priority-order setting screen as exemplified in FIG. 11 on the display device 23. This priority-order setting screen of FIG. 11 is for designating the priority item by which employees are sorted in each group that is made on the group setting screen shown in FIG. 10.

In accordance with an instruction given from the input device 22 at the time of displaying the group setting screen shown in FIG. 10 on the display device 23, the CPU 20 groups information on the individual employees stored in the employee information file F1. At this time, the CPU 20 sorts the employees in each group in accordance with an instruction given at the time of displaying the priority-order setting screen shown in FIG. 11 on the display device 23. This allows the person in charge to quickly retrieve a proper employee and promptly supplement a needed labor.

Figure 12:
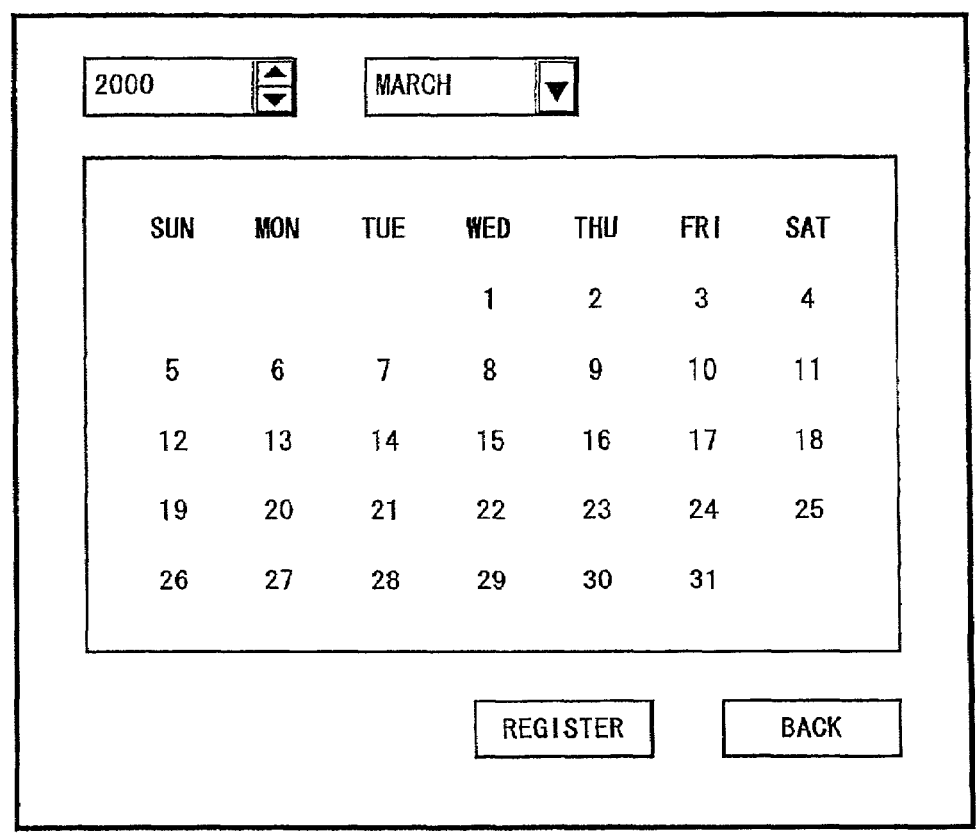
FIG. 12 is a diagram exemplifying a day-off setting screen according to the present invention.

Suppose that while the data maintenance screen shown in FIG. 4 is displayed on the display device 23, the person in charge instructs the depression of a SET DAY OFF button B13 shown on the "calendar data" area by manipulating the input device 22. In this case, the CPU 20 displays a day-off setting screen as exemplified in FIG. 12 on the display device 23. This day-off setting screen of FIG. 12 permits the setting of a day off in the store or the like and information indicating the set day off is stored in the work management file F2.

Suppose that while the data maintenance screen shown in FIG. 4 is displayed on the display device 23, the person in charge instructs the depression of a SET NUMBER OF PERSONS button B14 shown on the "calendar data" area by manipulating the input device 22. In this case, the CPU 20 displays a number-of-persons setting screen as exemplified in FIG. 13 on the display device 23. This number-of-persons setting screen of FIG. 13 permits the setting of the number of persons needed for a predetermined time slot on each day of the week for the type of job that requires securing of labors. Information indicating the set number of persons is stored in the work management file F2.

Suppose that while the data maintenance screen shown in FIG. 4 is displayed on the display device 23, the person in charge instructs the depression of a SET EVENT button B15 shown on the "calendar data" area by manipulating the input device 22. In this case, the CPU 20 displays an event setting screen as exemplified in FIG. 14 on the display device 23. This event setting screen of FIG. 14 is for registering the number of persons different from the number of persons on each day of the week set on the number-of-persons setting screen shown in FIG. 13. For example, the event setting screen permits the setting of the number of persons when a labor different from the ordinary one becomes necessary. Information indicating the date of an event and the number of persons that have been set on the event setting screen is stored in the work management file F2.

A description will now be given of the operation of the work management system at the time of making a shift.

First, while the main menu screen shown in FIG. 3 is displayed on the display device 23, the person in charge instructs the depression of the MAKE TEMPORARY SHIFT TABLE button B1 (FIG. 3) by manipulating the input device 22. This instructs the work management apparatus 12 to start making a shift.

Figure 15:
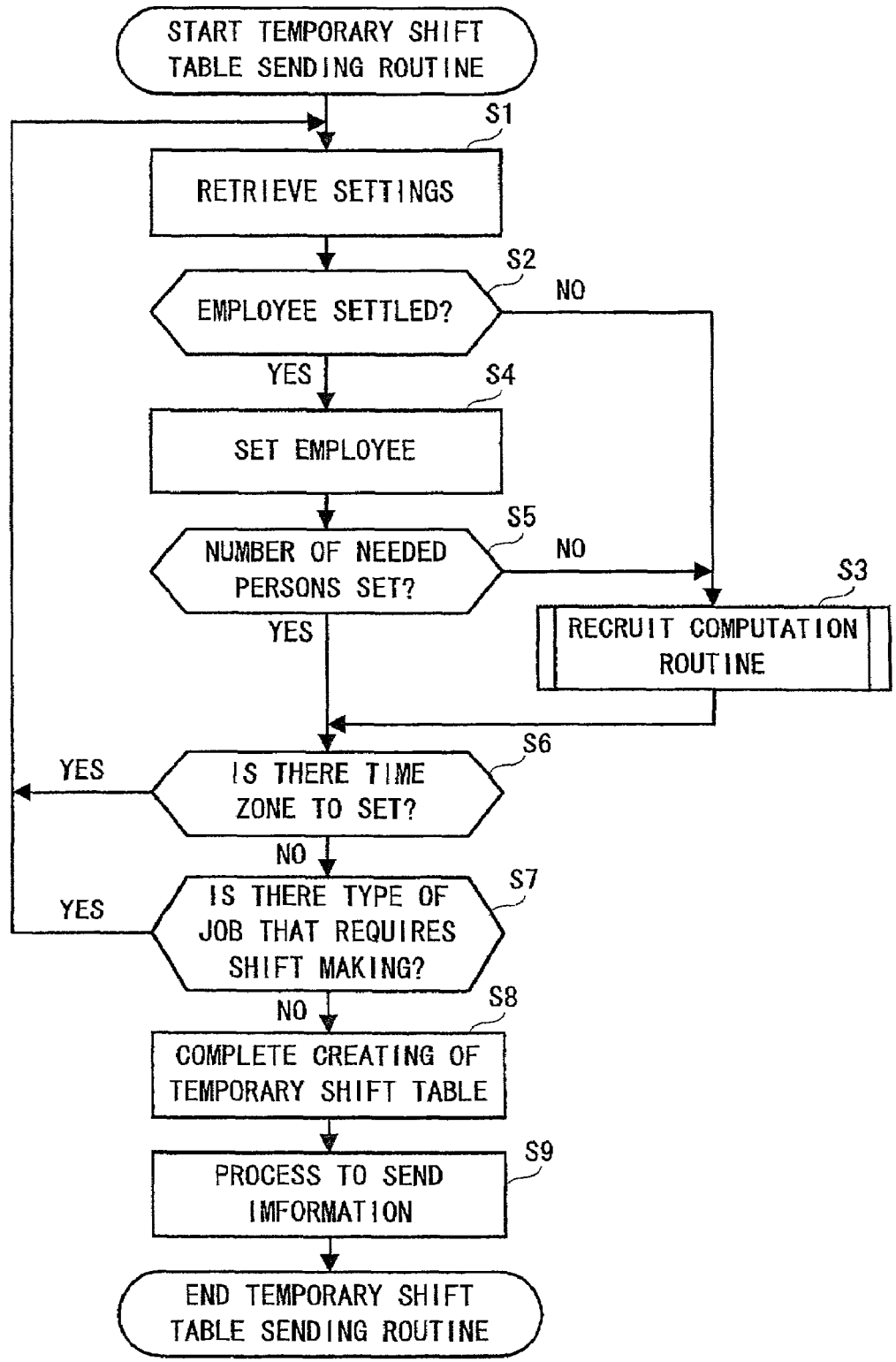
FIG. 15 is a flowchart for explaining a temporary shift table sending routine according to the present invention.

When detecting that the depression of the MAKE TEMPORARY SHIFT TABLE button B1 has been instructed, the CPU 20 initiates a temporary shift table sending routine illustrated in a flowchart in FIG. 15.

When the temporary shift table sending routine starts, the CPU 20 executes an access permission/denial process, such as a log-in process, then specifies the type of job for which a shift is to be made, and retrieves the set contents for each time slot in the period over which the shift is to be made (step S1).

At this time, the CPU 20 specifies the setting about the number of persons for each type of job that becomes necessary for each time slot in the period over which the shift is to be made from, for example, the information input on the number-of-persons setting screen shown in FIG. 13 and stored in the work management file F2.

The CPU 20 may be programmed to display on the input device 22 a screen for inputting the period over which the shift is to be made so that the person in charge makes the shift over the input period by manipulating the input device 22, every time the depression of the MAKE TEMPORARY SHIFT TABLE button B1 is instructed.

The CPU 20 then determines whether or not an employee scheduled to work in the searched time slot is settled (step S2).

When the CPU 20 determines that the employee is not settled (NO in step S2), the CPU 20 executes a recruit computation routine to be discussed later (step S3) and then proceeds to step S6.

When the CPU 20 determines that the employee is settled (YES in step S2), on the other hand, the CPU 20 generates information indicating that the employee has been set in a temporary shift table and stores the table in the temporary shift information file F3 (step S4) to be stored in the file unit 24.

Thereafter, the CPU 20 determines whether or not the number of employees required for the searched time slot has been set (step S5). When the CPU 20 determines that the number of employees needed has not been set (NO in step S5), the CPU 20 proceeds to the step S3 to perform the recruit computation routine to be discussed later.

When the CPU 20 determines that the number of employees needed has been set (YES in step S5), the CPU 20 determines whether or not there is any other time slot for which an employee should be set (step S6). When the CPU 20 determines that there is another time slot for which an employee should be set (YES in step S6), the CPU 20 returns to the step S1. When the CPU 20 does not determine that there is another time slot for which an employee should be set (NO in step S6), on the other hand, the CPU 20 determines whether or not there is a type of job for which a shift should be made (step S7).

When the CPU 20 determines that there is a type of job for which a shift should be made (YES in step S7), the CPU 20 returns to the step S1.

When the CPU 20 determines that there is no type of job for which a shift should be made (NO in step S7), on the other hand, the CPU 20 decides that making the temporary shift table is completed (step S8) and executes a process of sending to the user terminals $11_1$-$11_m$ information about the temporary shift table stored in the temporary shift information file F3 (step S9). More specifically, the CPU 20 creates an e-mail containing the information about the temporary shift table stored in the temporary shift information file F3, and transfers the e-mail to the mail server 14 over the network 10 from the communication interface 25 to be sent to the user terminals $11_1$-$11_m$. The CPU 20 specifies an e-mail for each employee from information on the individual employees stored in the employee information file F1.

At this time, the CPU 20 stores the information about the temporary shift table, stored in the temporary shift information file F3, in the shift setting information file F6 whose format can be referred to on a Web and stores the information in the Web server 13. This allows the information about the temporary shift table to be sent to the user terminals $11_1$-$11_m$ in the form of an e-mail and allows the user terminals $11_1$-$11_m$ to access the Web server 13 over the Internet (including a simple Internet type) and acquire the information about the temporary shift table.

The information about the temporary shift table may be sent at a mail sending time set on the time setting screen shown in FIG. 7. In this case, the CPU 20 reads the work management file F2 to specify the mail sending time that has been set on the time setting screen shown in FIG. 7, stands by until that time comes, and sends the e-mail to the user terminals $11_1$-$11_m$.

As apparent from the above, the work management apparatus 12 can send the information about the temporary shift table to the user terminals 11$_1$-11$_m$ over the network 10. This scheme can certainly inform each employee of the working schedule, can secure required labors adequately and easily, and can manage working time schedules of individual employees.

Figure 18:
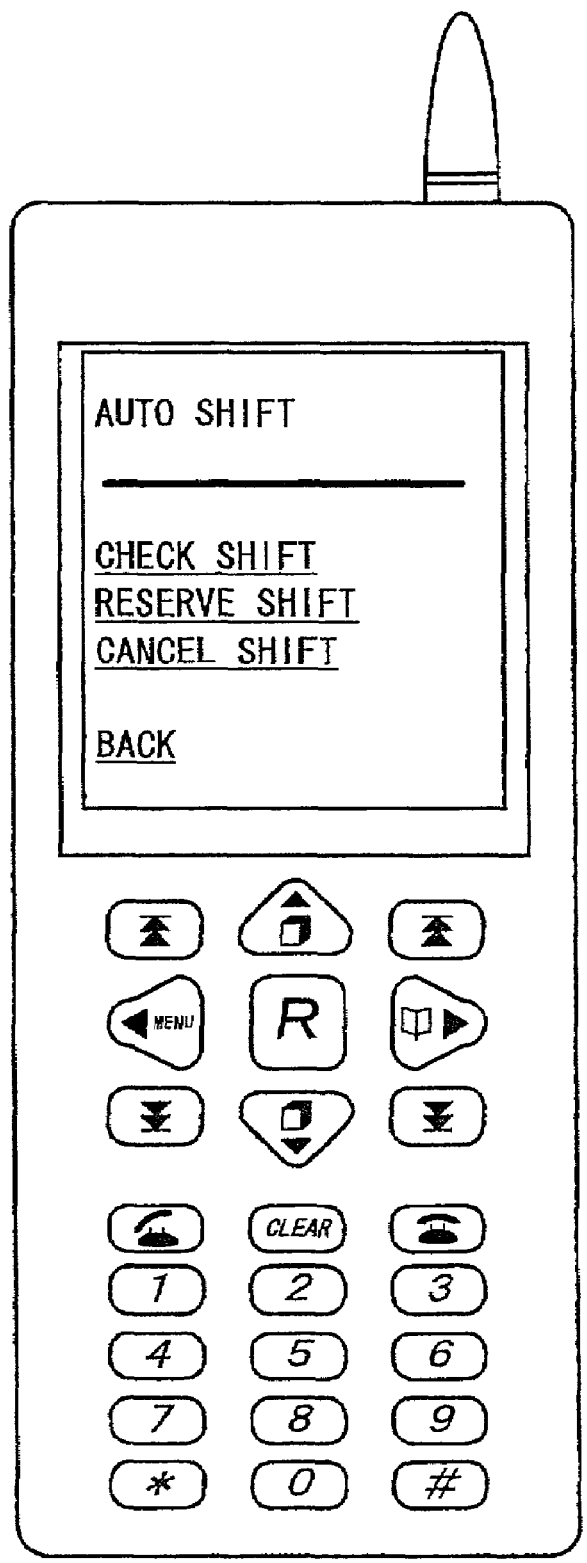
FIG. 18 is a diagram illustrating one example wherein a user terminal shows information on a shift table according to the present invention.

FIG. 18 is a diagram illustrating one example wherein the user terminals 11$_1$-11$_m$ show acquired information.

An employee can check the temporary shift table and send the work management apparatus 12 information requesting the making of a shift that is convenient for the employee by manipulating the associated one of the user terminals 11$_1$-11$_m$. When sending the information about the temporary shift table is completed, the CPU 20 terminates the temporary shift table sending routine.

Figure 16:
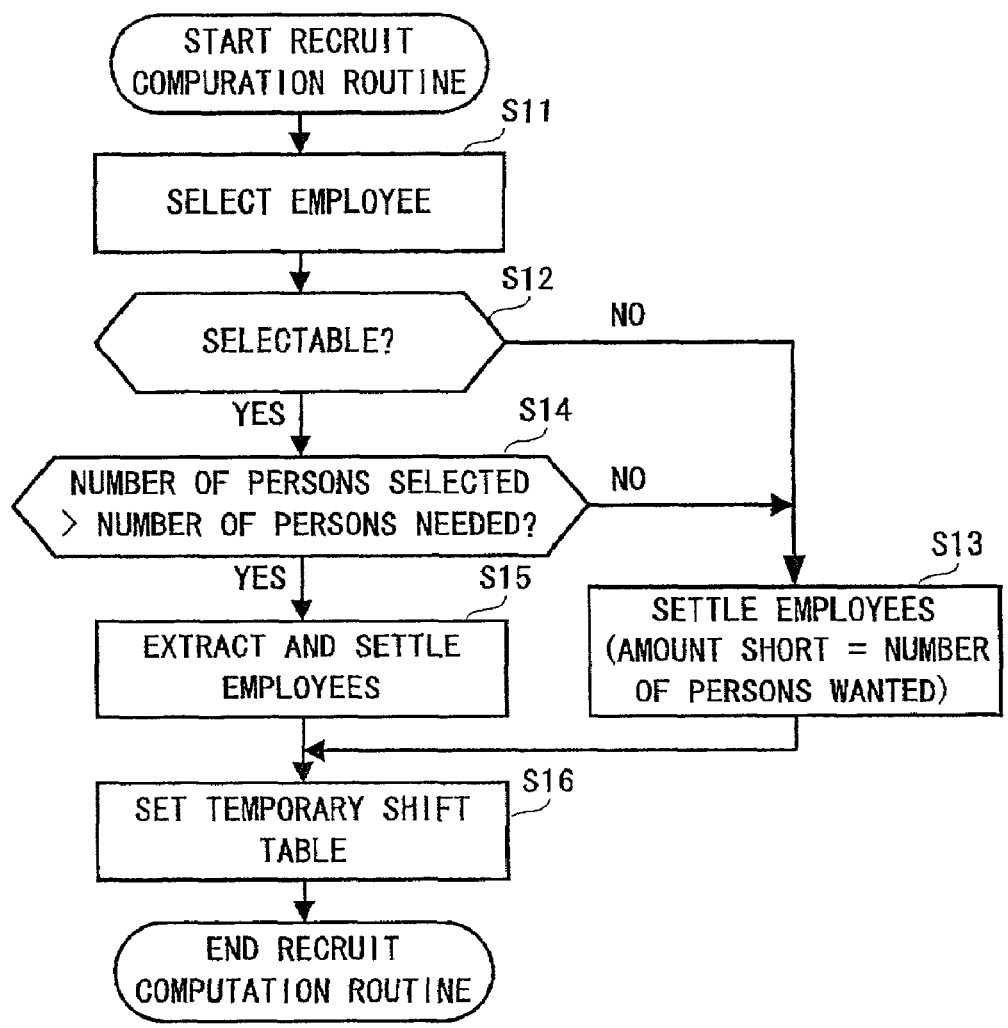
FIG. 16 is a flowchart for explaining a recruit computation routine according to the present invention.

A description will now be given of the recruit computation routine that is executed in step S3 in the above-described temporary shift table sending routine. FIG. 16 is a flowchart for explaining the recruit computation routine.

When the recruit computation routine is initiated, the CPU 20 reads information on the employees stored in the employee information file F1 to select an employee who matches with the type of job and time slot for which a shift is to be made (step S11). At this time, the CPU 20 makes a selection while determining whether or not employees in the group made according to the information input on, for example, the group setting screen shown in FIG. 10 and the priority-order setting screen shown in FIG. 11 are adequate one by one.

The CPU 20 determines whether or not an employee who matches with the type of job and time slot for which the shift is to be made has been selected (step S12).

When the CPU 20 determines that such an employee has not been selected (NO in step S12), the CPU 20 sets the number of employees short as the number of persons wanted and settles the selected employee as one scheduled to work (step S13). When the CPU 20 determines that employees have been selected (YES in step S12), the CPU 20 determines if the number of the selected employees is greater than the number of persons needed for the time slot (step S14).

When the CPU 20 determines that the number of the selected employees is equal to or less than the number of required persons (NO in step S14), the CPU 20 proceeds to the step S13. When the CPU 20 determines that the number of the selected employees is greater than the number of required persons (YES in step S14), on the other hand, the CPU 20 extracts the required number of persons from the selected employees and settles them as employees scheduled to work (step S15).

Thereafter, the CPU 20 generates information indicating that those settled employees scheduled to work in the temporary shift table and stores the information in the temporary shift information file F3 (step S16), which then terminates the recruit computation routine.

At this time, the CPU 20 stores, in the temporary shift information file F3, information that makes the time slot specified with the number of persons wanted in the step S13 identifiable.

At the time of acquiring information on the temporary shift table on each of the user terminals 11$_1$-11$_m$, therefore, the work management apparatus 12 can inform each employee of personnel shortage in the person-wanted portion (time slot).

The work management apparatus 12 can make a shift for persons whose quantity differs from those in each time slot set on the number-of-persons setting screen shown in FIG. 13 or those in each time slot set on the event setting screen shown in FIG. 14 or can change an employee set in the temporary shift table once created. In this case, the person in charge instructs the depression of the CHECK/CHANGE SHIFT TABLE button B3 by manipulating the input device 22 while the main menu screen shown in FIG. 3 is displayed on the display device 23.

Figure 17:
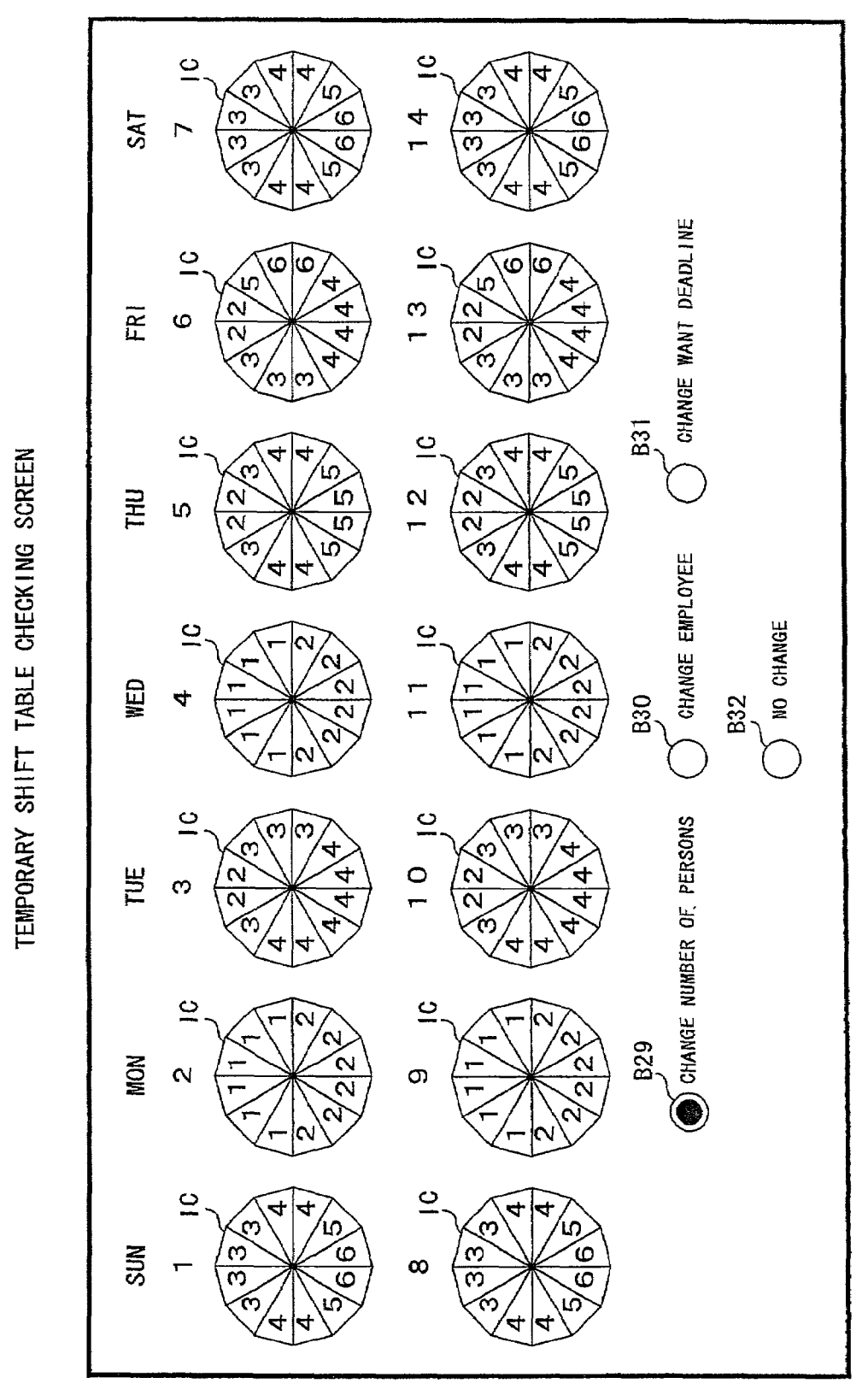

When detecting that the depression of the CHECK/CHANGE SHIFT TABLE button B3 has been instructed, the CPU 20 executes the access permission/denial process, such as a log-in process, and displays a temporary-shift-table checking screen as exemplified in FIG. 17 on the display device 23.

On the temporary-shift-table checking screen of FIG. 17, the CPU 20 displays an icon IC indicating the number of employees assigned to each time slot on the display device 23 for each day. The temporary-shift-table checking screen has a CHANGE NUMBER OF PERSONS button B29 for instructing alteration of the number of employees assigned to each time slot, a CHANGE EMPLOYEE button B30 for instructing alteration of an employee set in the temporary shift table, a CHANGE WANT DEADLINE button B31 for instructing alteration of the want deadline when an employee applies for the work in the time slot or the person-wanted range, and a NO CHANGE button B32 which indicates no alteration.

The person in charge can change the allocation of employees for each time slot by clicking the display area that corresponds to an item to be changed by manipulating the input device 22 and inputting instruction information indicating an item to be changed.

The information on the temporary shift table that has been changed in this way is stored in the temporary shift information file F3 to be stored in the file unit 24.

When a predetermined time, e.g., the time corresponding to the mail sending time that has been set on the time setting screen shown in FIG. 7 comes, the CPU 20 creates an e-mail based on the information on the temporary shift table stored in the temporary shift information file F3 and sends the e-mail to the user terminals 11$_1$-11$_m$. Further, the CPU 20 updates the shift setting information file F6 stored in the Web server 13 and makes the altered information on the temporary shift table referable on a Web.

FIG. 18 is a diagram illustrating one example wherein one of the user terminals 11$_1$-11$_m$ has accessed the Web server 13 over the network 10 and acquired information on a shift table of a simple Internet format.

By manipulating the user terminals 11$_1$-11$_m$, the individual employees can check their own working schedules shown on the temporary shift table and send messages indicating that they want to work in the time slot or the person-wanted range to the work management apparatus 12. Specifically, each of the user terminals 11$_1$-11$_m$ produces an e-mail whose contents reflect the manipulation by the associated employee and sends the e-mail to the mail server 14 over the network 10. The mail server 14 stores the e-mails received from the user terminals 11$_1$-11$_m$ in the associated mail boxes in the work management apparatus 12. Accordingly, each employee can acquire and read the information about the temporary shift table and can easily confirm the created shift. Each employee can easily apply for the work in the time slot or the person-wanted range where there is a personnel vacancy.

Thereafter, the person in charge indicates the work management apparatus 12 that the making of the shift is to be settled by instructing the depression of the MAKE SETTLED SHIFT TABLE button B2 by manipulating the input device 22 while the main menu screen shown in FIG. 3 is displayed on the display device 23. When detecting that the depression of the MAKE SETTLED SHIFT TABLE button B2 has been instructed, the CPU 20 initiates a settled-shift-table sending routine illustrated in a flowchart in FIG. 19.

Figure 19:
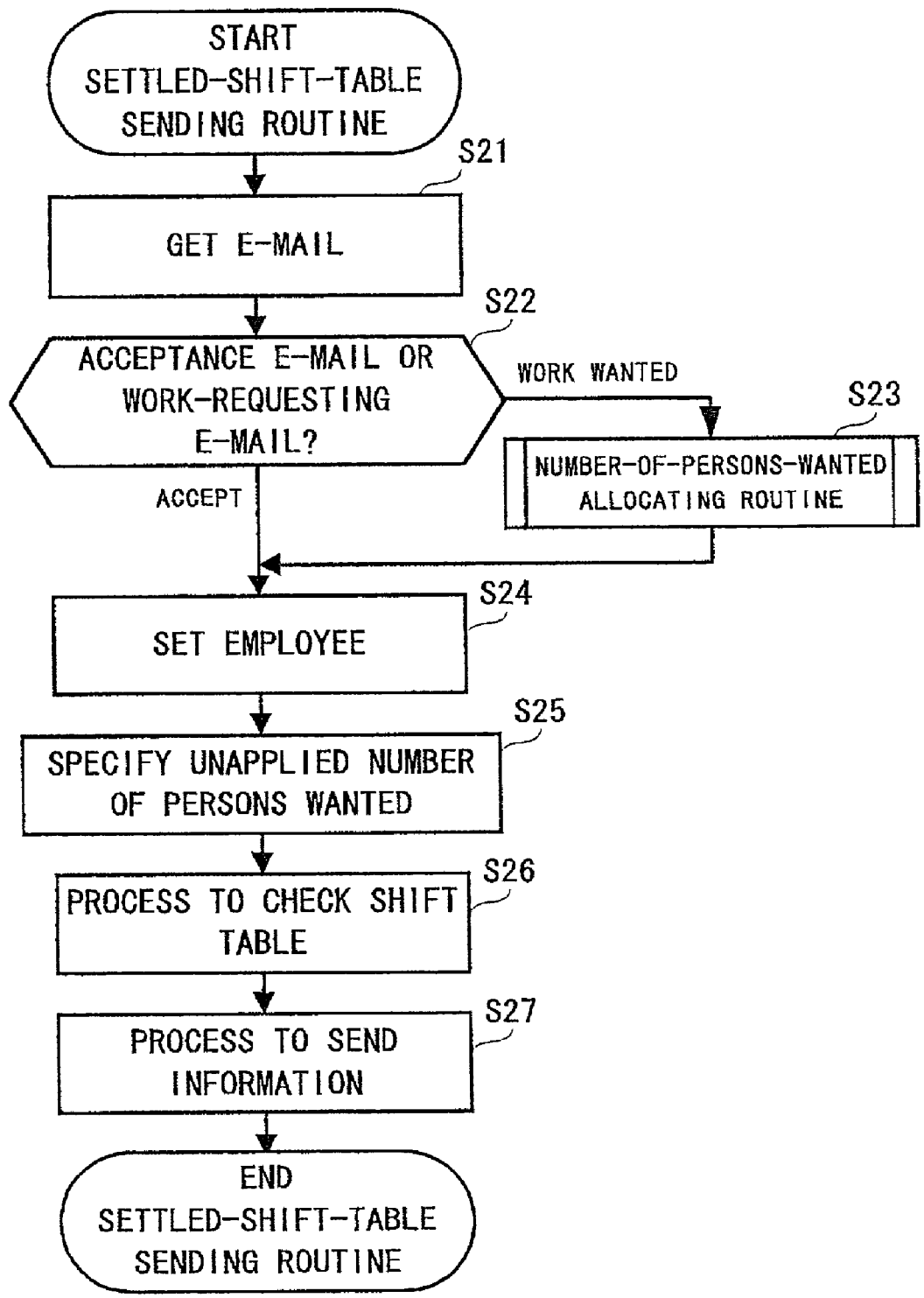
FIG. 19 is a flowchart for explaining a settled-shift-table sending routine according to the present invention.

When the settled-shift-table sending routine of FIG. 19 starts, the CPU 20 executes the access permission/denial process, such as a log-in process, and then accesses the mail server 14 through the communication interface 25 over the network 10 to get e-mails sent to the work management apparatus 12 from the user terminals $11_1$-$11_m$ (step S21).

The CPU 20 reads the acquired e-mails and determines whether each e-mail is a mail indicating acceptance of the working schedule set on the temporary shift table or a mail requesting work in a new time slot (step S22).

When determining that the obtained e-mail is a work-requesting mail (WORK WANTED in step S22), the CPU 20 executes a number-of-persons-wanted allocating routine to be discussed later (step S23).

When determining that the obtained e-mail is an acceptance mail (ACCEPT in step S22), the CPU 20 skips the number-of-persons-wanted allocating routine, generates information indicating that the employee has been set on the settled shift table, and stores the information in the settled shift information file F4 (step S24).

The CPU 20 specifies the number of persons short in the time slot in the person-wanted range that could not be supplemented by the work-requesting mails and the number of persons short in the time slot not taken by the acceptance mails that belong to the time slots for which employees have been set in the temporary shift table as an unapplied number of persons wanted (step S25). That is, the CPU 20 sets the number of persons for each time slot which is short of labors as an unapplied number of persons wanted, and stores information which makes the time slot specified with an unapplied number of persons wanted identifiable in the settled shift information file F4.

At this time, when the unapplied number of persons wanted is specified, the CPU 20 may send an e-mail requesting the employees to apply for the unapplied number of persons wanted or may send information for hiring a new employee.

For example, when the unapplied number of persons wanted is specified, the CPU 20 accesses the Web server 13 through the communication interface 25 over the network 10 to update the employment-seeker want file F5 and recruit a new employee. In this case, the Web server 13 makes the employment-seeker want file F5 referable by multiple communication units that are not limited to the user terminals $11_1$-$11_m$. This can secure shorted labors easily and adequately.

Thereafter, the CPU 20 executes a process for allowing the person in charge to check the settled shift table, such as displaying the information stored in the settled shift information file F4 on the display device 23 (step S26), and executes a process of sending information about the settled shift table to the user terminals $11_1$-$11_m$ (step S27).

More specifically, the CPU 20 produces an e-mail including the information on the settled shift table stored in the settled shift information file F4 and transfers the e-mail to the mail server 14 through the communication interface 25 over the network 10 for distribution to the user terminals $11_1$-$11_m$. The CPU 20 specifies the mail address of each employee from the information on the employees stored in the employee information file F1. At this time, the CPU 20 stores the information about the settled shift table, stored in the settled shift information file F4, in the shift plan information file F7 whose format can be referred to on a Web, and stores the information in the Web server 13. This allows the information on the settled shift table to be sent to the user terminals $11_1$-$11_m$ in the form of an e-mail and allows the user terminals $11_1$-$11_m$ to acquire the information on the settled shift table by accessing the Web server 13 over the Internet or the like.

The information on the settled shift table may be sent at a mail sending time set on the time setting screen shown in FIG. 7. In this case, the CPU 20 reads the work management file F2 to specify the mail sending time that has been set on the time setting screen shown in FIG. 7, stands by until that time comes, and sends the e-mail to the user terminals $11_1$-$11_m$.

When the transmission of the information on the settled shift table is completed, the CPU 20 terminates the settled-shift-table sending routine.

As apparent from the above description, the work management apparatus 12 can send the information about the settled shift table to the user terminals $11_1$-$11_m$ over the network 10. This scheme can reliably notify each employee of the working schedule, can secure required labors adequately and easily, and can manage working time schedules of individual employees.

Figure 20:
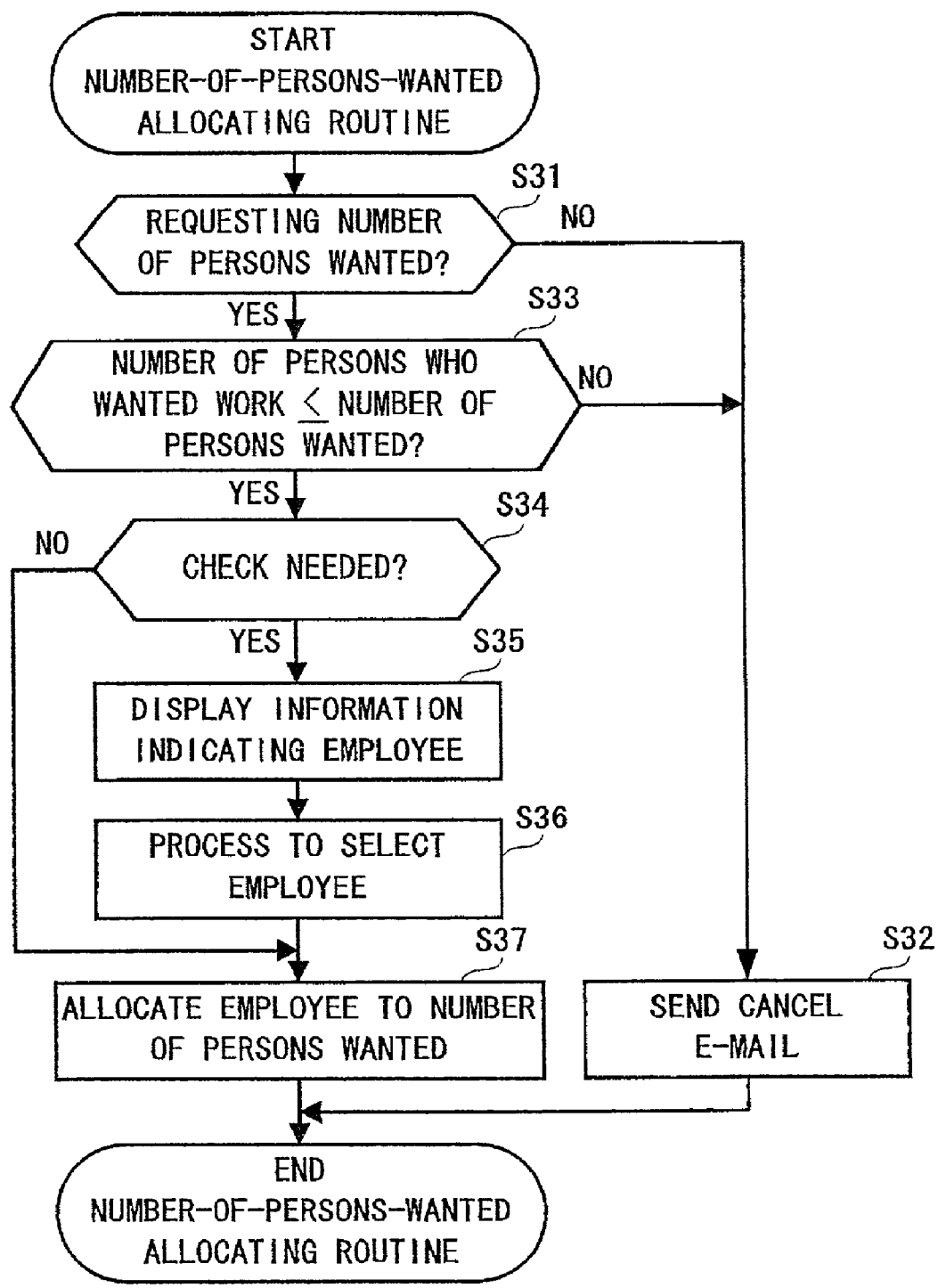
FIG. 20 is a flowchart for explaining a number-of-persons-wanted allocating routine according to the present invention.

A description will now be given of the number-of-persons-wanted allocating routine the CPU 20 executes in step S23 in the settled-shift-table sending routine. FIG. 20 is a flowchart for explaining the number-of-persons-wanted allocating routine.

When the number-of-persons-wanted allocating routine starts, the CPU 20 determines whether or not the work-requesting mail obtained from the mail server 14 is requesting a work in the time slot that is specified with the number of persons wanted (step S31).

When the CPU 20 determines that the work-requesting mail is not requesting a work in the time slot that is specified with the number of persons wanted (NO in step S31), the CPU 20 sends a cancel mail to the user terminals $11_1$-$11_m$ which have sent the work-requesting mail (step S32), and then terminates the number-of-persons-wanted allocating routine. The cancel mail is an e-mail which notifies that the shift cannot be made because the time slot a work which has been requested by the e-mail sent from the associated one of the user terminals $11_1$-$11_m$ is not specified with the number of persons wanted.

When the CPU 20 determines that the work-requesting mail is requesting a work in the time slot that is specified with the number of persons wanted (YES in step S31), on the other hand, the CPU 20 then determines whether or not the number of employees who wanted the work is equal to or smaller than the set number of persons wanted (step S33).

When the CPU 20 determines that the number of employees who wanted the work exceeds the set number of persons wanted (NO in step S33), the CPU 20 proceeds to the step S32 and sends a cancel mail to those employees who wanted the work and who would overflow the number of persons wanted.

When the CPU 20 determines that the number of employees who wanted the work is equal to or smaller than the set number of persons wanted (YES in step S33), on the other hand, the CPU 20 reads the work management file F2 and determines whether or not to require checking by the person in charge at the time of allocating employees to the number of persons wanted (step S34). Information which indicates whether or not to require checking by the person in charge at the time of allocating employees is prestored in the work management file F2. The CPU 20 reads this information to determine if the person in charge should execute the checking.

When the CPU 20 determines that checking by the person in charge is needed (YES in step S34), the CPU 20 displays information indicating the employees who requested the work by the work-requesting mail on the display device 23 (step S35). Thereafter, upon reception of an instruction to select an employee to be allocated to the number of persons wanted from the input device 22, the CPU 20 executes a process of selecting an employee in accordance with the instruction (step S36).

When the CPU 20 determines that checking by the person in charge is unnecessary (NO in step S34), on the other hand, the CPU 20 skips steps S35 and S36 and proceeds to step S37. The CPU 20 allocates the employees who requested the work by the work-requesting mail to the number of persons wanted, thereby preparing to set the employees on the settled shift table (step S37), and then terminates the number-of-persons-wanted allocating routine. At this time, the CPU 20 may send a cancel mail to those employees who have not been selected in the step S36.

Every time a predetermined time passes, the CPU 20 access the mail server 14 through the communication interface 25 over the network 10 to thereby receive e-mails addressed to the work management apparatus 12. When the received e-mails include an e-mail indicating cancellation of the working schedule given on the already settled shift table (settled shift table), the CPU 20 detects this e-mail as a cancel mail. When detecting that the work management apparatus 12 has received a cancel mail, the CPU 20 executes an urgent-shift making routine illustrated in a flowchart in FIG. 21.

Figure 21:
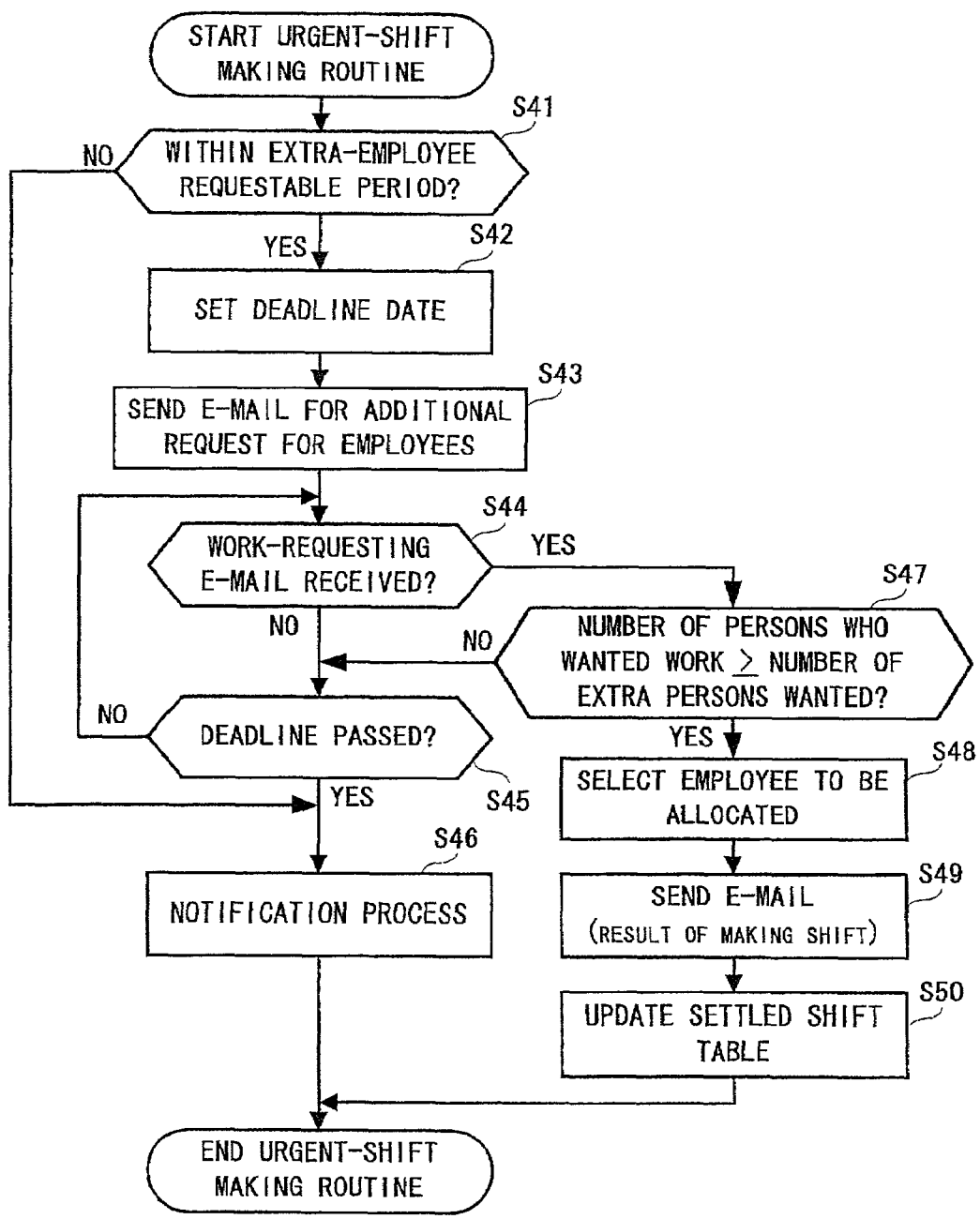
FIG. 21 is a flowchart for explaining an urgent-shift making routine according to the present invention.

When the urgent-shift making routine of FIG. 21 starts, the CPU 20 determines whether or not the time of reception of the cancel mail lies within a predetermined extra-employee requestable period (step S41). The extra-employee requestable period, which is set beforehand, is a period in which a request for additional or extra employees is possible when an e-mail indicating cancellation of the working schedule from an employee is received after information on the settled shift table has been sent to the user terminals $11_1$-$11_m$.

When the CPU 20 determines that the time of reception of the cancel mail lies within the extra-employee requestable period (YES in step S41), the CPU 20 sets the deadline for requesting extra employees in accordance with the time slot for which the cancellation of the working schedule has been notified by an e-mail (step S42).

The CPU 20 reads the information on the employees stored in the employee information file F1 to specify the mail address of each employee and sends an e-mail to additionally request for employees workable in the time slot for which cancellation of the working schedule has been notified (step S43).

At the time of displaying the group setting screen shown in FIG. 10 on the display device 23, the CPU 20 specifies the destination of the e-mail requesting for extra employees, treating employees in a group, made in accordance with an instruction input through the input device 22, as a unit. It is therefore possible to properly select employees according to the types of job, qualifications, experiences, and so forth of the employees whose information is stored in the employee information file F1 and to send an e-mail requesting for extra employees.

At this time, the CPU 20 does not send the e-mail requesting for extra employees to those employees who have notified cancellation by a cancel mail and those employees who have already been scheduled to work in the same time slot for which extra employees are to be requested.

Thereafter, the CPU 20 regularly accesses the mail server 14 through the communication interface 25 over the network 10 and determines whether or not it has received a work-requesting mail (step S44).

When determining that a work-requesting mail has not been received (NO in step S44), the CPU 20 determines whether or not the deadline set in the step S42 has passed (step S45). When determining that the deadline has not passed yet (NO in step S45), the CPU 20 returns to step S44 and waits for a work-requesting mail to come. When determining that the deadline has passed (YES in step S45), the CPU 20 performs a process of notifying the person in charge of such an event by, for example, displaying an image warning of the shortage of workable employees on the display device 23, and terminates the urgent-shift making routine (step S46).

When the CPU 20 determines in the step S41 that the time of reception of a cancel mail lies out of the extra-employee requestable period, the CPU 20 also performs the above process to notify the person in charge of such an event and terminates the urgent-shift making routine.

When determining that a work-requesting mail has been received (YES in step S44), the CPU 20 determines whether or not the number of employees who requested for the work by a work-requesting mail is equal to or greater than the number of extra persons wanted (step S47).

When the CPU 20 determines that the number of employees who requested for the work by a work-requesting mail is less than the number of extra persons wanted (NO in step S47), the CPU 20 proceeds to the step S45 and determines if the deadline has passed. When the CPU 20 determines that the number of employees who requested for the work by a work-requesting mail is equal to or greater than the number of extra persons wanted (YES in step S47), the CPU 20 selects those from the employees who requested for the work which are to be allocated to the time slot for which the extra employees have been requested (step S48).

The CPU 20 sends an e-mail indicating the result of making the shift to the employees who requested for the work by a work-requesting mail (step S49). Specifically, the CPU 20 sends an e-mail notifying that the working schedule has been allocated to those employees who have been allocated to the time slot for which the extra employees have been requested, and sends a cancel mail to those who have not been selected in the step S48.

Thereafter, the CPU 20 generates information which indicates that the employees who have been allocated to the time slot for which the extra employees have been requested and stores the information in the settled shift information file F4 to update the settled shift table (step S50).

With the above design, when there is any employee who wants to cancel the working schedule, the shift is reorganized automatically and a new employee can be allocated so that required labors can be secured easily and adequately.

As described above, the present invention can allow the work management apparatus 12 to exchange information with the user terminals $11_1$-$11_m$ by an e-mail or a document which can be referred to on a Web and make a shift by adequately setting the working schedules. It is therefore possible to secure required labors adequately and easily and manage working time schedules of individual employees.

The invention is not limited to the above-described embodiment, but can be modified and adapted in various other forms.

For example, the foregoing description of the embodiment has discussed the case in which while the main menu screen shown in FIG. 3 is displayed on the display device 23, the person in charge instructs the depression of the MAKE SETTLED SHIFT TABLE button B2 by manipulating the input device 22 and the CPU 20 executes the settled-shift-table sending routine in response to that instruction. The present invention is not, however, limited to this particular case.

The CPU 20 may execute the settled-shift-table sending routine when a predetermined time passes after sending information on the temporary shift table to the user terminals $11_1$-$11_m$.

Further, the CPU 20 may generate information that defines the format of a curriculum vitae and store the information in the employment-seeker want file F5 held in the Web server 13, so that a user who applies for a new employee prepares a curriculum vitae according to the format.

In this case, the CPU 20 may extract information on the curriculum vitae from the information that has been sent by the user who applies for a new employee and stores the received information in the employee information file F1 to be stored in the file unit 24. When the user is hired as a new employee, therefore, it is possible to quickly acquire the information about the employee and use it at the time of making a shift.

Further, the work management apparatus 12 is not limited to a special-purpose apparatus, but may be realized by using an ordinary computer. Specifically, if a program which allows a computer to execute the individual processes discussed above is recorded on recording media (CD-ROMs, floppy disks, MOs, ROMs, or the like) and is distributed, the program when installed on a computer and made to run on an OS (Operating System) can allow the computer to function as the work management apparatus 12. Further, the program may be distributed by transmitting the program signal embodied in carrier wave over a communication network.

Obviously, numerous modifications and variations of the present invention are possible in light of the above teachings. It is therefore to be understood that within the scope of the appended claims, the invention may be practiced otherwise than as specifically described herein.

What is claimed is:

1. A work management system comprising:

a management apparatus connected to a plurality of mobile telephones via a network, wherein said management apparatus comprises:

a first information acquiring unit that displays a number-of-persons setting screen for setting a number of persons needed for each of predetermined time slots on each day on a display unit, and acquires information including a number of persons input via a manipulation device in accordance with said number-of-persons setting screen;

a second information acquiring unit that displays an event setting screen for setting a date of an event, and a number of persons needed for each of predetermined time slots on the date of the event, which number is different from an ordinarily needed number of persons on said display unit, and acquires information including a date and a number of persons input via said manipulation device in accordance with said event setting screen;

a work management file for storing the information acquired by said first and second information acquiring units;

an employee information file for storing employee information regarding employees who are grouped;

a detecting unit that displays a menu screen including a temporary shift table generation button on said display unit, and detects a depression of said temporary shift table generation button manipulated via said manipulation device;

a temporary shift table generation unit that generates a temporary shift table in which work schedules of employees are temporarily set based on the information stored in said work management file and said employee information file, when said detecting unit detects a depression of said temporary shift table generation button;

a temporary shift table distribution unit that distributes an e-mail including an address for browsing said temporary shift table generated by said temporary shift table generation unit, to said mobile telephones via said network;

a response information receiving unit that receives response information sent from said mobile telephones in response to said e-mail distributed by said temporary shift table distribution unit;

a recruiting information distribution unit that identifies a time slot in which workforce shortages are occurring, derives a number of vacancies, and distributes an e-mail for recruiting a person to fill a workforce shortage occurring in the time slot according to the response information received by said response information receiving unit, to said mobile telephones of employees who belong to a group in question and who are not on the job during the time slot;

an application information receiving unit that receives application information sent from said mobile telephones in response to said e-mail distributed by said recruiting information distribution unit;

a settled shift table generation unit that generates a settled shift table in which scheduled working hours of employees are settled, based on the response information received by said response information receiving unit and the application information received by said application information receiving unit; and a settled shift table distribution unit that distributes an e-mail including an address for browsing said settled shift table generated by said settled shift table generation unit to said mobile telephones via said network, and wherein said mobile telephones comprises:

a display unit that displays said temporary shift table at said address in response to a key manipulation of a user, after said e-mail distributed from said temporary shift table distribution unit is received;

a response information sending unit that sends response information including an approval for said temporary shift table displayed on said display unit, or a request for re-organizing of said temporary shift table to said management apparatus; and an application information sending unit that sends application information to said management apparatus in response to a key manipulation of the user, after said e-mail distributed from said recruiting information distribution unit is received, wherein said display unit displays said settled shift table at said address in response to a key manipulation of the user, after said e-mail distributed from said settled shift table distribution unit is received.

2. The work management system according to claim 1, wherein said management apparatus further comprises an order change unit that displays a priority-order setting screen for setting a priority item used for ranking employees on said display unit, and reorders said employee information stored in said employee information file based on a priority item set in accordance with said priority-order setting screen.

3. The work management system according to claim 1, wherein said management apparatus further comprises a day-off information storing unit that displays a day-off setting screen for setting a day off of an employing company, and stores information set in accordance with said day-off setting screen in said work management file.

4. The work management system according to claim 1, wherein said work management apparatus further comprises a group change unit that displays a group setting screen for grouping employees according to types of jobs specified in an employing company, or workable time slots on said display unit, and groups said employee information stored in said employee information file according to types of jobs or time slots set in accordance with said group setting screen.

5. The work management system according to claim 1, wherein said work management apparatus further comprises:
   a response information reception unit that receives said response information sent from said mobile telephones; and
   a settled shift table generation unit that generates a settled shift table in which work schedules of employees are settled, based on said response information received by said response information reception unit, and
   said distribution unit distributes an e-mail including an address for browsing said settled shift table generated by said settled shift table generation unit, to said mobile telephones via said network.

6. A work management method for a management apparatus connected to a plurality of mobile telephones via a network, comprising:
   first information acquiring of displaying a number-of-persons setting screen for setting a number of persons needed for each of predetermined time slots on each day on a display unit, and acquiring information including a number of persons input via a manipulation device in accordance with said number-of-persons setting screen;
   second information acquiring of displaying an event setting screen for setting a date of an event, and a number of persons needed for each of predetermined time slots on the date of the event, which number is different from an ordinarily needed number of persons on the display unit, and acquiring information including a date and a number of persons input via the manipulation device in accordance with said event setting screen;
   storing the information acquired at said first and second information acquiring in a work management file;
   displaying a menu screen including a temporary shift table generation button on the display unit, and detecting a depression of said temporary shift table generation button manipulated via the manipulation device;
   temporary shift table generating of generating a temporary shift table in which work schedules of employees are temporarily set based on the information stored in said work management file and information stored in an employee information file storing information regarding employees who are grouped, when a depression of said temporary shift table generation button is detected at said detecting;
   temporary shift table distributing of distributing an e-mail including an address for browsing said temporary shift table generated at said temporary shift table generating, to said mobile telephones via said network;
   response information receiving of receiving response information sent from said mobile telephones in response to said e-mail distributed at said temporary shift table distributing;
   recruiting information distributing of identifying a time slot in which workforce shortages are occurring, deriving a number of vacancies, and distributing an e-mail for recruiting a person to fill a workforce shortage occurring in the time slot according to the response information received at said response information receiving, to said mobile telephones of employees who belong to a group in question and who are not on the job during the time slot;
   application information receiving of receiving application information sent from said mobile telephones in response to said e-mail distributed at said recruiting information distributing;
   settled shift table generating of generating a settled shift table in which scheduled working hours of employees are settled, based on the response information received at said response information receiving and the application information received at said application information receiving; and
   settled shift table distributing of distributing an e-mail including an address for browsing said settled shift table generated at said settled shift table generating, to said mobile telephones via said network.

7. A computer-readable recording medium storing a program for controlling a computer connected to a plurality of mobile telephones via a network to function as:
   a first information acquiring unit that displays a number-of-persons setting screen for setting a number of persons needed for each of predetermined time slots on each day on a display unit, and acquires information including a number of persons input via a manipulation device in accordance with said number-of-persons setting screen;
   a second information acquiring unit that displays an event setting screen for setting a date of an event, and a number of persons needed for each of predetermined time slots on the date of the event, which number is different from an ordinarily needed number of persons on said display unit, and acquires information including a date and a number of persons input via said manipulation device in accordance with said event setting screen;
   a work management file for storing the information acquired by said first and second information acquiring units;
   an employee information file for storing employee information regarding employees who are grouped;
   a detecting unit that displays a menu screen including a temporary shift table generation button on said display unit, and detects a depression of said temporary shift table generation button manipulated via said manipulation device;

a temporary shift table generation unit that generates a temporary shift table in which work schedules of employees are temporarily set based on the information stored in said work management file and said employee information file, when said detecting unit detects a depression of said temporary shift table generation button;

a temporary shift table distribution unit that distributes an e-mail including an address for browsing said temporary shift table generated by said temporary shift table generation unit, to said mobile telephones via said network;

a response information receiving unit that receives response information sent from said mobile telephones in response to said e-mail distributed by said temporary shift table distribution unit;

a recruiting information distribution unit that identifies a time slot in which workforce shortages are occurring, derives a number of vacancies, and distributes an e-mail for recruiting a person to fill a workforce shortage occurring in the time slot according to the response information received by said response information receiving unit, to said mobile telephones of employees who belong to a group in question and who are not on the job during the time slot;

an application information receiving unit that receives application information sent from said mobile telephones in response to said e-mail distributed by said recruiting information distribution unit;

a settled shift table generation unit that generates a settled shift table in which scheduled working hours of employees are settled, based on the response information received by said response information receiving unit and the application information received by said application information receiving unit; and a settled shift table distribution unit that distributes an e-mail including an address for browsing said settled shift table generated by said settled shift table generation unit to said mobile telephones via said network.

* * * * *